United States Patent
Sasaki et al.

(10) Patent No.: US 8,482,879 B1
(45) Date of Patent: Jul. 9, 2013

(54) MAGNETIC HEAD FOR PERPENDICULAR MAGNETIC RECORDING HAVING A RETURN PATH SECTION

(71) Applicants: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/713,778

(22) Filed: Dec. 13, 2012

(51) Int. Cl.
*G11B 5/127* (2006.01)
*G11B 5/17* (2006.01)

(52) U.S. Cl.
USPC ................. 360/123.03; 360/125.03

(58) Field of Classification Search
USPC ............. 369/13.14; 360/123.03, 125.03, 360/123.06, 123.02, 317, 119.02, 123.11, 360/125.17, 125.16
See application file for complete search history.

(56) References Cited

U.S. PATENT DOCUMENTS

| | | | |
|---|---|---|---|
| 6,954,340 B2 | 10/2005 | Shukh et al. | |
| 8,218,264 B1 * | 7/2012 | Sasaki et al. | 360/125.16 |
| 8,300,357 B1 * | 10/2012 | Sasaki et al. | 360/123.06 |
| 8,345,381 B1 * | 1/2013 | Sasaki et al. | 360/123.03 |
| 8,345,382 B1 * | 1/2013 | Sasaki et al. | 360/123.06 |
| 8,385,019 B1 * | 2/2013 | Sasaki et al. | 360/123.03 |

FOREIGN PATENT DOCUMENTS

JP    A-2011-086361    4/2011

* cited by examiner

*Primary Examiner* — Ali Neyzari
(74) *Attorney, Agent, or Firm* — Oliff & Berridge, PLC

(57) ABSTRACT

A magnetic head includes a coil, a main pole, and a return path section. The return path section includes a plurality of magnetic path portions that separate a magnetic flux into a plurality of fluxes and allow the fluxes to pass therethrough in parallel. The coil includes a winding portion disposed around an assemblage of the plurality of magnetic path portions. In any cross section that intersects all of the plurality of magnetic path portions, the distance between two adjacent magnetic path portions is smaller than the minimum width of each of the two adjacent magnetic path portions, and only a nonmagnetic layer is present between the two adjacent magnetic path portions.

5 Claims, 13 Drawing Sheets

MAGNETIC HEAD FOR PERPENDICULAR MAGNETIC RECORDING HAVING A RETURN PATH SECTION

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a return path section.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head unit having a magnetoresistive element (hereinafter, also referred to as MR element) for reading and a write head unit having an induction-type electromagnetic transducer for writing are stacked on a substrate.

The write head unit in a magnetic head for perpendicular magnetic recording includes a coil, a main pole, and a return path section. The main pole and the return path section each have an end face located in a medium facing surface facing a recording medium. The coil produces a magnetic field corresponding to data to be written on the recording medium. The main pole produces a write magnetic field from its end face. The return path section is connected to the main pole so that a space through which part of the coil passes is defined by the main pole and the return path section. The return path section allows a magnetic flux that has been produced from the end face of the main pole and has magnetized the recording medium to flow back to the main pole. The main pole and the return path section form a magnetic path for passing a magnetic flux corresponding to the magnetic field produced by the coil. A magnetic head for perpendicular magnetic recording having such a configuration is disclosed in, for example, U.S. Pat. No. 6,954,340 B2.

As the frequency of write signals is increased in order to provide higher recording density, it is required of the magnetic head to provide an improved rate of change in the direction of the magnetic flux produced from the end face of the main pole. To meet this requirement, it is desirable to reduce the length of the magnetic path formed by the main pole and the return path section.

Further, as the frequency of write signals is increased, the skin effect of magnetic flux becomes noticeable in the magnetic path formed by the main pole and the return path section. The skin effect of magnetic flux is the phenomenon that the magnetic flux density increases in the vicinity of the surface of a magnetic substance, whereas the magnetic flux density decreases inside the magnetic substance other than the vicinity of the surface thereof. The skin effect of magnetic flux raises the problem that as the frequency of write signals is increased, the magnetic path formed by the main pole and the return path section becomes unable to pass a large amount of magnetic flux therethrough.

In general, the return path section includes a portion that passes through inside the innermost circumference of the coil. This portion is particularly high in magnetic flux density. Hereinafter, this portion will be referred to as the flux concentrating portion. When the skin effect of magnetic flux becomes noticeable in the flux concentrating portion, the problem mentioned above becomes noticeable.

To address this problem, it is conceivable to increase the cross-sectional area of the flux concentrating portion. However, an increase in the cross-sectional area of the flux concentrating portion leads to an increase in the size of the coil and an increase in the total length thereof. This causes an increase in the length of the magnetic path formed by the main pole and the return path section and an increase in the resistance of the coil.

Thus, it has conventionally been difficult to inhibit a decrease of magnetic flux caused by the skin effect of magnetic flux while preventing an increase in the length of the magnetic path formed by the main pole and the return path section and an increase in the resistance of the coil.

OBJECT AND SUMMARY OF THE INVENTION

It is an object of the present invention to provide a magnetic head for perpendicular magnetic recording that is capable of inhibiting a decrease of magnetic flux caused by the skin effect of magnetic flux while preventing an increase in the length of the magnetic path formed by the main pole and the return path section and an increase in the resistance of the coil.

A magnetic head for perpendicular magnetic recording of the present invention includes a medium facing surface facing a recording medium, a coil producing a magnetic field corresponding to data to be written on the recording medium, a main pole, and a return path section. The main pole has a first end face located in the medium facing surface. The main pole allows a magnetic flux corresponding to the magnetic field produced by the coil to pass, and produces a write magnetic field for writing data on the recording medium by means of a perpendicular magnetic recording system. The return path section is made of a magnetic material and has a second end face located in the medium facing surface. The return path section is connected to the main pole so that a space through which part of the coil passes is defined by the main pole and the return path section.

The return path section includes a plurality of magnetic path portions that separate the magnetic flux into a plurality of fluxes and allow the fluxes to pass therethrough in parallel. The magnetic head further includes a nonmagnetic layer separating the plurality of magnetic path portions from each other. The coil includes a winding portion disposed around an assemblage of the plurality of magnetic path portions. In any cross section that intersects all of the plurality of magnetic path portions, the distance between two adjacent magnetic path portions is smaller than the minimum width of each of the two adjacent magnetic path portions, and only the nonmagnetic layer is present between the two adjacent magnetic path portions.

The minimum width of a magnetic path portion in the aforementioned cross section is defined as follows. First, two parallel straight lines that are in contact with the outer edges of the magnetic path portion are assumed in the aforementioned cross section. There will exist a plurality of pairs of such straight lines. The distance between the two straight lines of one of the plurality of pairs, the one of the plurality of pairs being the shortest in distance between the two straight lines, is the minimum width of the magnetic path portion.

In the magnetic head for perpendicular magnetic recording of the present invention, the plurality of magnetic path portions may intersect a cross section perpendicular to the direction of travel of the recording medium.

In the magnetic head for perpendicular magnetic recording of the present invention, the second end face may include an end face portion located on the front side in the direction of travel of the recording medium relative to the first end face. The return path section may further include a write shield and a yoke layer, the write shield having the second end face, the yoke layer being magnetically connected to the write shield and located on the front side in the direction of travel of the recording medium relative to the main pole. The plurality of magnetic path portions may magnetically couple the yoke layer and the main pole to each other.

The magnetic head for perpendicular magnetic recording of the present invention may further include a waveguide and a plasmon generator. The waveguide includes a core through which light propagates, and a cladding provided around the core. The plasmon generator has a near-field light generating part located in the medium facing surface. The plasmon generator is configured so that a surface plasmon is excited on the plasmon generator based on the light propagating through the core, and near-field light for applying heat to the recording medium is generated from the near-field light generating part based on the surface plasmon.

Where the magnetic head for perpendicular magnetic recording of the present invention includes the waveguide and the plasmon generator, the first end face and the second end face may be located at positions different from each other in the direction of travel of the recording medium, and the near-field light generating part may be located between the first end face and the second end face. The return path section may further include first and second columnar portions and a coupling portion, the first and second columnar portions being located on opposite sides of the core in the track width direction and spaced from the core, the coupling portion coupling the first and second columnar portions to each other. Further, the plurality of magnetic path portions may be connected to the coupling portion, being disposed such that the coupling portion is interposed between the core and the plurality of magnetic path portions.

In the magnetic head for perpendicular magnetic recording of the present invention, the return path section includes a plurality of magnetic path portions, and the coil includes a winding portion disposed around an assemblage of the plurality of magnetic path portions. The total surface area of the plurality of magnetic path portions is greater than the surface area of one flux concentrating portion having a volume equal to the total volume of the plurality of magnetic path portions and the nonmagnetic layer disposed therebetween. According to the present invention, this makes it possible to inhibit a decrease of magnetic flux caused by the skin effect of magnetic flux while preventing an increase in the length of the magnetic path formed by the main pole and the return path section and an increase in the resistance of the coil.

Other and further objects, features and advantages of the present invention will appear more fully from the following description.

DETAILED DESCRIPTION OF THE PREFERRED EMBODIMENTS

First Embodiment

Figure 1:
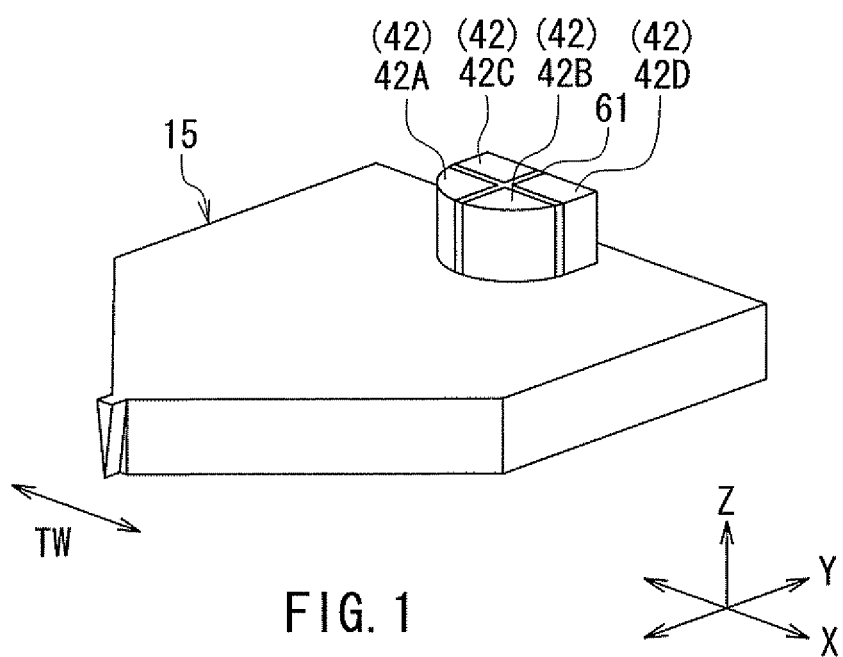
FIG. 1 is a perspective view showing the main part of a magnetic head according to a first embodiment of the invention.
Figure 2:
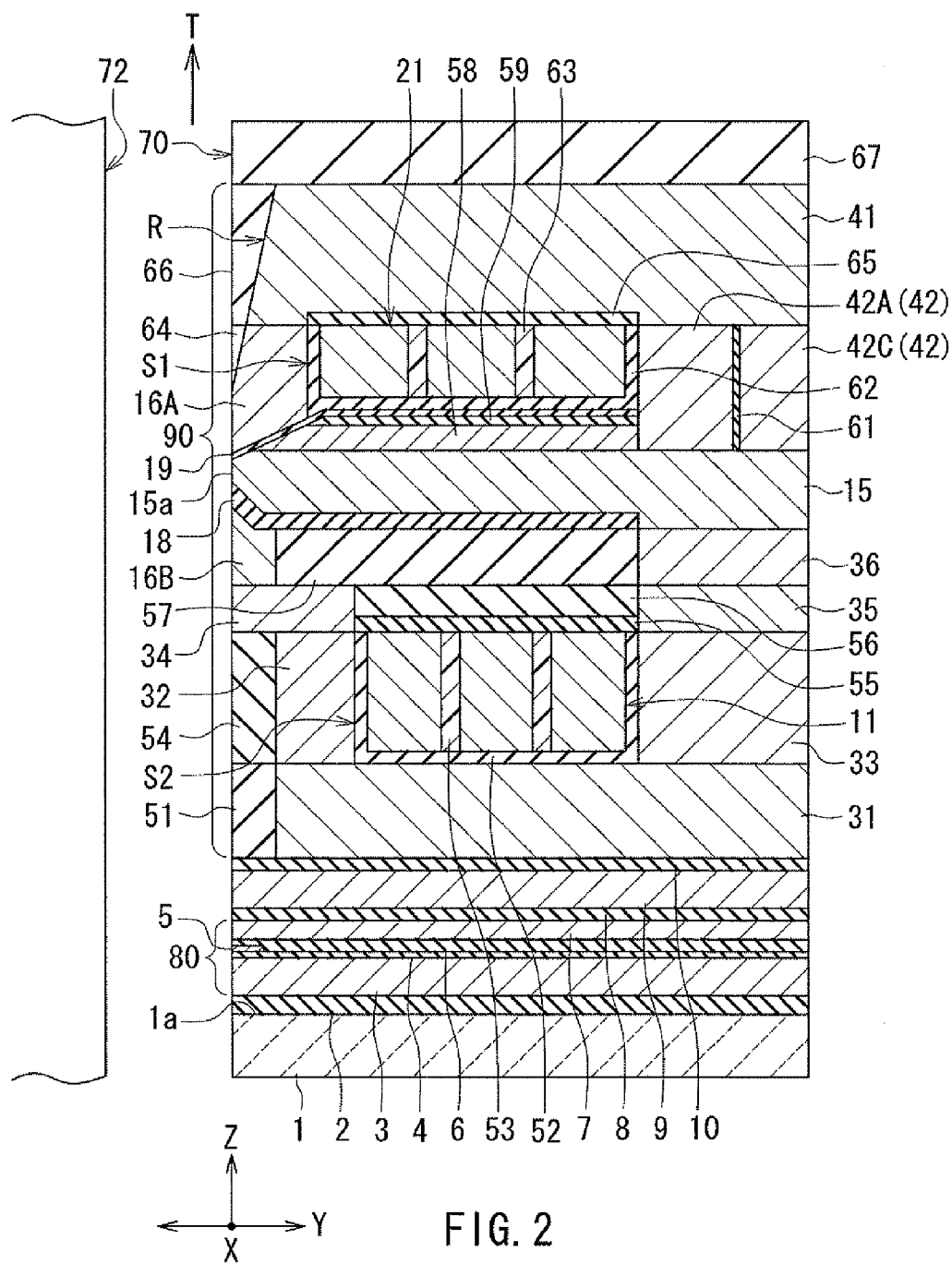
FIG. 2 is a cross-sectional view showing the magnetic head according to the first embodiment of the invention.
Figure 3:
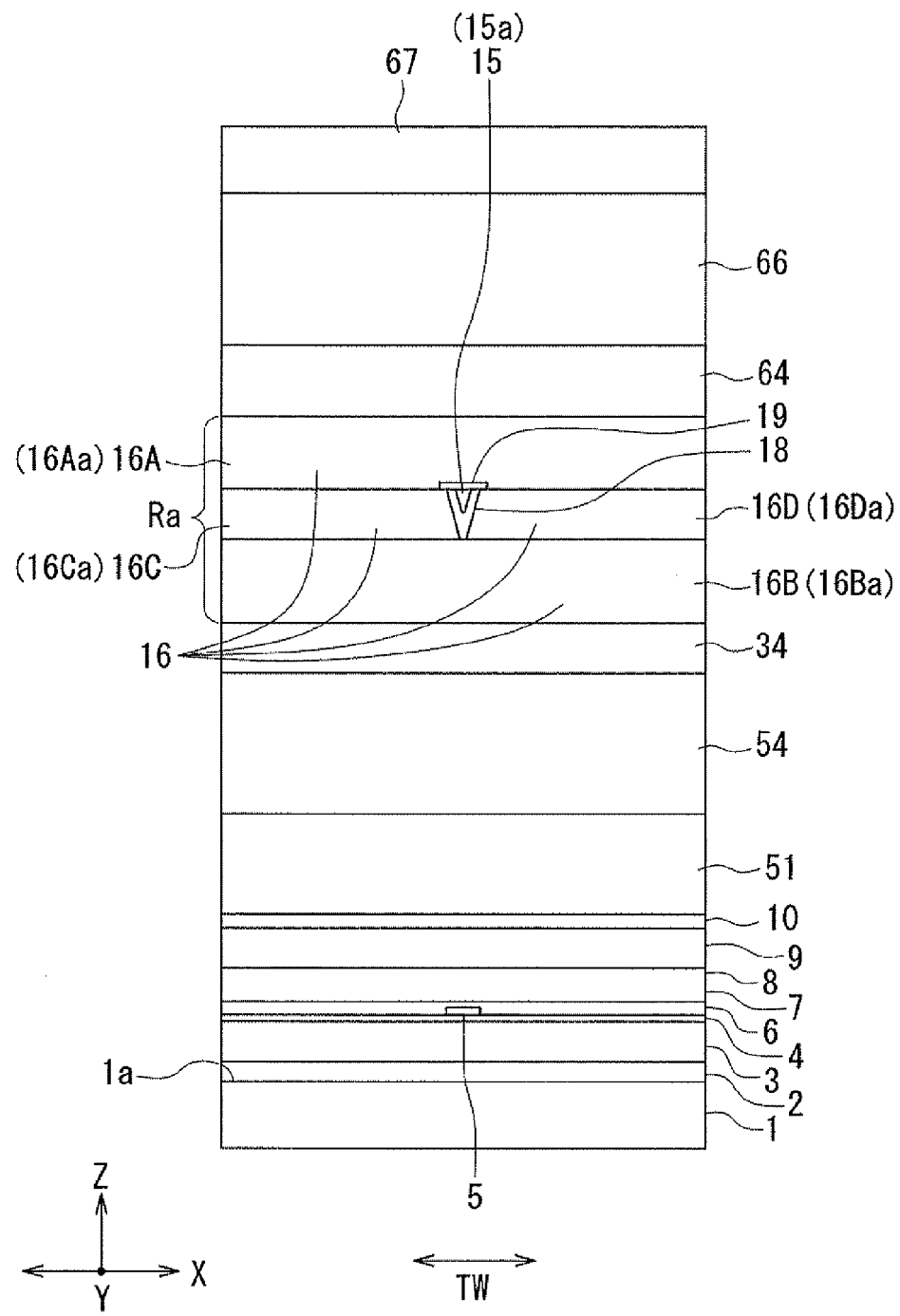
FIG. 3 is a front view showing the medium facing surface of the magnetic head according to the first embodiment of the invention.
Figure 4:
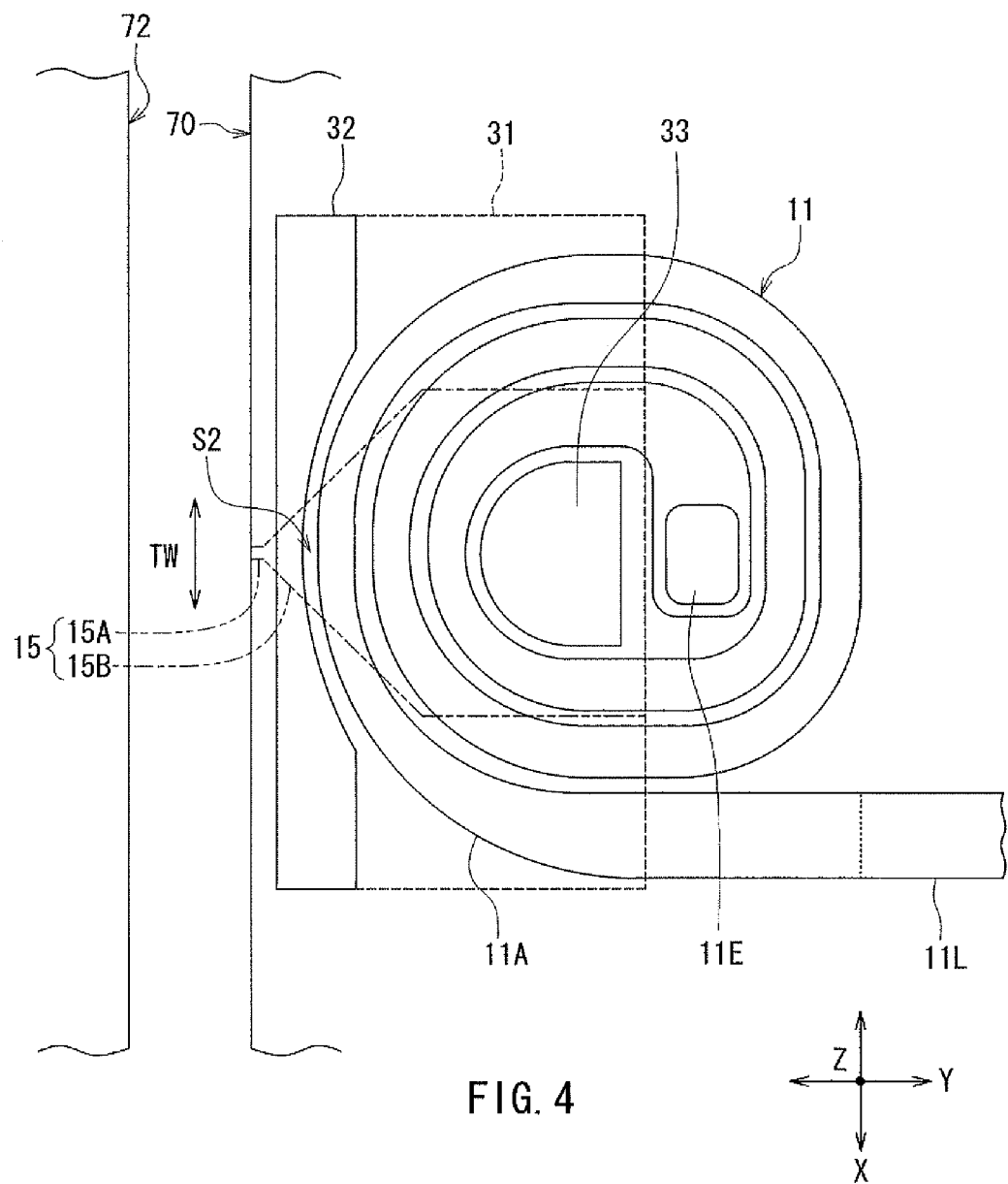
FIG. 4 is a plan view showing a second portion of a coil of the magnetic head according to the first embodiment of the invention.
Figure 5:
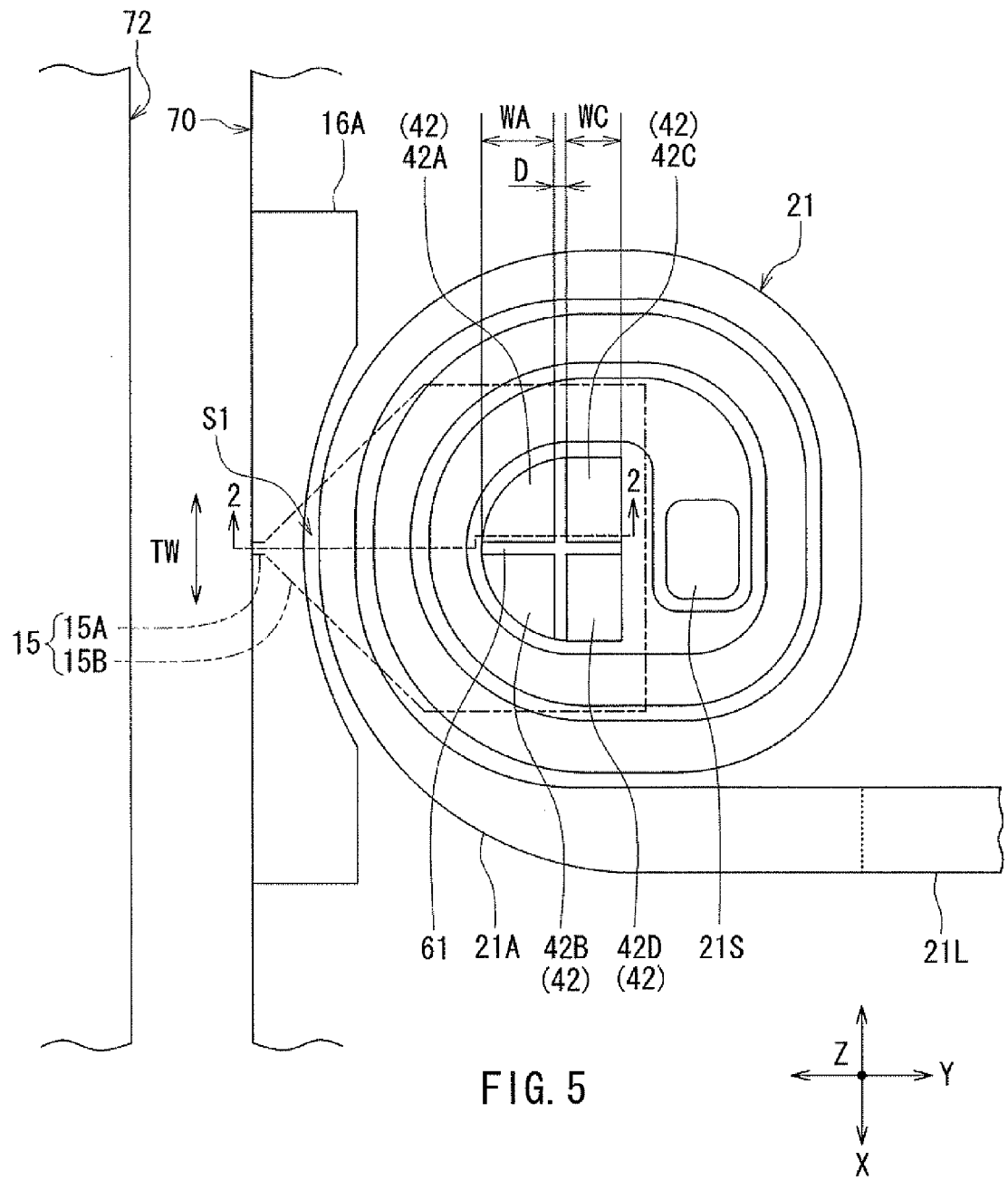
FIG. 5 is a plan view showing a first portion of the coil of the magnetic head according to the first embodiment of the invention.

Preferred embodiments of the present invention will now be described in detail with reference to the drawings. First, reference is made to FIG. 1 to FIG. 5 to describe the configuration of a magnetic head according to a first embodiment of the invention. FIG. 1 is a perspective view showing the main part of the magnetic head according to the present embodiment. FIG. 2 is a cross-sectional view showing the magnetic head according to the present embodiment. The arrow with the symbol T in FIG. 2 indicates the direction of travel of a recording medium. FIG. 3 is a front view showing the medium facing surface of the magnetic head according to the present embodiment. FIG. 4 is a plan view showing a second portion of a coil of the magnetic head according to the present embodiment. FIG. 5 is a plan view showing a first portion of the coil of the magnetic head according to the present embodiment. Note that FIG. 2 shows a cross section taken at the position indicated by line 2-2 of FIG. 5. In each of FIG. 1 and FIG. 3 to FIG. 5, the arrow with the symbol TW indicates the track width direction.

The magnetic head for perpendicular magnetic recording (hereinafter simply referred to as a magnetic head) according to the present embodiment is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 2, the magnetic head has a medium facing surface 70 facing a recording medium 72. Here, X direction, Y direction, and Z direction will be defined as follows. The X direction is a direction parallel to the track width direction TW. The Y direction is a direction perpendicular to the medium facing surface 70. The Z direction is the direction of travel of the recording medium 72 as viewed from the slider. The X, Y, and Z directions are orthogonal to one another.

As shown in FIG. 2 and FIG. 3, the magnetic head includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a bottom shield layer 3 made of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; a top shield gap film 6 which is an insulating film disposed on the MR element 5; and a top shield layer 7 made of a magnetic material and disposed on the top shield gap film 6. The Z direction is also a direction perpendicular to the top surface 1a of the substrate 1.

An end of the MR element 5 is located in the medium facing surface 70. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The parts from the bottom shield layer 3 to the top shield layer 7 constitute a read head unit 80. The magnetic head further includes an insulating layer 8 disposed on the top shield layer 7, a middle shield layer 9 made of a magnetic material and disposed on the insulating layer 8, a nonmagnetic layer 10 made of a nonmagnetic material and disposed on the middle shield layer 9, and a write head unit 90 disposed on the nonmagnetic layer 10. The insulating layer 8 and the nonmagnetic layer 10 are made of alumina, for example.

The write head unit 90 includes a coil, a main pole 15, and a return path section R. The coil produces a magnetic field corresponding to data to be written on the recording medium 72. The coil includes a first portion 21 and a second portion 11. Both the first portion 21 and the second portion 11 are made of a conductive material such as copper. The first portion 21 and the second portion 11 are connected in series or in parallel. The main pole 15 has a first end face 15a located in the medium facing surface 70. The main pole 15 allows a magnetic flux corresponding to the magnetic field produced by the coil to pass, and produces a write magnetic field for writing data on the recording medium 72 by means of a perpendicular magnetic recording system.

As shown in FIG. 3, the return path section R has a second end face Ra located in the medium facing surface 70. The second end face Ra includes first to fourth end face portions 16Aa, 16Ba, 16Ca, and 16Da. The first end face portion 16Aa is located on the front side in the direction T of travel of the recording medium 72 relative to the first end face 15a. The second end face portion 16Ba is located on the rear side in the direction T of travel of the recording medium 72 relative to the first end face 15a. The third and fourth end face portions 16Ca and 16Da are located on opposite sides of the first end face 15a in the track width direction TW. In the medium facing surface 70, the first to fourth end face portions 16Aa, 16Ba, 16Ca, and 16Da are arranged to wrap around the first end face 15a.

The return path section R is made of a magnetic material. The material employed for the return path section R may be CoFeN, CoNiFe, NiFe, or CoFe, for example.

The return path section R includes: a write shield 16 having the second end face Ra; magnetic layers 31 to 36; a yoke layer 41; and a plurality of magnetic path portions. The yoke layer 41 is magnetically coupled to the write shield 16, and is located on the front side in the direction T of travel of the recording medium 72 relative to the main pole 15.

In the example shown in FIG. 1 and FIG. 5, the return path section R includes four magnetic path portions 42A, 42B, 42C, and 42D as the plurality of magnetic path portions. Hereinafter, any magnetic path portion in the present embodiment will be represented by reference numeral 42. The plurality of magnetic path portions 42 magnetically couple the yoke layer 41 and the main pole 15 to each other.

The magnetic layer 31 is located on the nonmagnetic layer 10. The magnetic layers 32 and 33 are both located on the magnetic layer 31. The magnetic layer 32 is located near the medium facing surface 70. The magnetic layer 33 is located farther from the medium facing surface 70 than is the magnetic layer 32. Each of the magnetic layers 31 and 32 has an end face facing toward the medium facing surface 70 and located at a distance from the medium facing surface 70. As shown in FIG. 4, the second portion 11 of the coil is wound approximately three turns around the magnetic layer 33.

The write head unit 90 further includes an insulating layer 51 made of an insulating material, disposed on the nonmagnetic layer 10 and surrounding the magnetic layer 31, an insulating film 52 made of an insulating material and interposed between the second portion 11 and the magnetic layers 31 to 33, an insulating layer 53 made of an insulating material and disposed in the space between adjacent turns of the second portion 11, and an insulating layer 54 made of an insulating material and disposed around the second portion 11 and the magnetic layer 32. The insulating layers 51 and 54 and the insulating film 52 are made of alumina, for example. The insulating layer 53 is made of photoresist, for example.

The magnetic layer 34 is located on the magnetic layer 32 and the insulating layer 54. The magnetic layer 35 is located on the magnetic layer 33. The magnetic layer 34 has an end face located in the medium facing surface 70. The write head unit 90 further includes an insulating layer 55 made of an insulating material and located on the top surfaces of the second portion 11, the insulating film 52 and the insulating layers 53 and 54, and an insulating layer 56 made of an insulating material, located on the insulating layer 55 and surrounding the magnetic layers 34 and 35. The insulating layers 55 and 56 are made of alumina, for example.

As shown in FIG. 3, the write shield 16 includes a first shield 16A, a second shield 16B, and two side shields 16C and 16D. The two side shields 16C and 16D are located on opposite sides of the main pole 15 in the track width direction TW.

The first shield 16A is located on the front side in the direction T of travel of the recording medium 72 relative to the main pole 15. The second shield 16B is located on the rear side in the direction T of travel of the recording medium 72 relative to the main pole 15. The side shields 16C and 16D magnetically couple the first shield 16A and the second shield 16B to each other.

As shown in FIG. 2 and FIG. 3, the first shield 16A has the first end face portion 16Aa, and also has a bottom surface, a top surface, and a connecting surface connecting the first end face portion 16Aa and the top surface to each other. The distance from the medium facing surface 70 to an arbitrary point on the connecting surface of the first shield 16A increases with increasing distance from the arbitrary point to the top surface 1a of the substrate 1. As shown in FIG. 3, the second shield 16B has the second end face portion 16Ba. The side shield 16C has the third end face portion 16Ca. The side shield 16D has the fourth end face portion 16Da.

The second shield 16B is located on the magnetic layer 34. The magnetic layer 36 is located on the magnetic layer 35. The write head unit 90 further includes a nonmagnetic layer 57 made of a nonmagnetic material. The nonmagnetic layer 57 is located on part of the top surface of the magnetic layer 34 and on the top surface of the insulating layer 56, and surrounds the second shield 16B and the magnetic layer 36. The nonmagnetic layer 57 is made of alumina, for example.

The main pole 15 has a top surface (see FIG. 2), which is the surface located at a forward end in the direction T of travel of the recording medium 72, and has a bottom end (see FIG. 2) opposite to the top surface. The main pole 15 further has first and second side parts (see FIG. 3) that are opposite to each other in the track width direction TW. The side shield 16C has a first sidewall opposed to the first side part of the main pole 15. The side shield 16D has a second sidewall opposed to the second side part of the main pole 15.

The side shields 16C and 16D are located on the second shield 16B and in contact with the top surface of the second shield 16B. The write head unit 90 further includes a second gap layer 18 made of a nonmagnetic material and interposed between the main pole 15 and each of the second shield 16B and the side shields 16C and 16D. The second gap layer 18 is arranged to extend along the sidewalls of the side shields 16C and 16D, the top surface of the second shield 16B, and the top surface of the nonmagnetic layer 57. The second gap layer 18 is made of a nonmagnetic material. The nonmagnetic material employed to form the second gap layer 18 may be an insulating material or a nonmagnetic metal material. Alumina is an example of an insulating material that can be employed to form the second gap layer 18. Ru is an example of a nonmagnetic metal material that can be employed to form the second gap layer 18. The second gap layer 18 has an opening for exposing the top surface of the magnetic layer 36.

The main pole 15 is disposed above the second shield 16B and the nonmagnetic layer 57 such that the second gap layer 18 is interposed between the main pole 15 and the top surfaces of the second shield 16B and the nonmagnetic layer 57. As shown in FIG. 3, the second gap layer 18 is interposed also between the main pole 15 and each of the side shields 16C and 16D.

A part of the bottom end of the main pole 15 away from the medium facing surface 70 is in contact with the top surface of the magnetic layer 36. The main pole 15 is made of a magnetic metal material. The material of the main pole 15 may be one of NiFe, CoNiFe, and CoFe, for example. The shape of the main pole 15 will be described in detail later.

The write head unit 90 further includes a nonmagnetic layer, not illustrated, made of a nonmagnetic material and disposed around the main pole 15 and the side shields 16C and 16D. In the present embodiment, the non-illustrated nonmagnetic layer is made of a nonmagnetic insulating material such as alumina, in particular.

The write head unit 90 further includes a nonmagnetic metal layer 58 made of a nonmagnetic metal material, located at a distance from the medium facing surface 70 and lying on a part of the top surface of the main pole 15, and an insulating layer 59 made of an insulating material and lying on the top surface of the nonmagnetic metal layer 58. The nonmagnetic metal layer 58 is made of Ru, NiCr, or NiCu, for example. The insulating layer 59 is made of alumina, for example.

The write head unit 90 further includes a first gap layer 19 interposed between the main pole 15 and the first shield 16A. The first gap layer 19 is disposed to cover the main pole 15, the nonmagnetic metal layer 58, and the insulating layer 59. The first gap layer 19 is made of a nonmagnetic material. The material employed for the first gap layer 19 may be a nonmagnetic insulating material such as alumina, or a nonmagnetic conductive material such as Ru, NiCu, Ta, W, NiB, or NiP.

The first shield 16A is disposed over the side shields 16C and 16D and the first gap layer 19, and is in contact with the top surfaces of the side shields 16C and 16D and the first gap layer 19. In the medium facing surface 70, part of the first end face portion 16Aa of the first shield 16A is separated from the first end face 15a of the main pole 15 by a predetermined distance created by the thickness of the first gap layer 19. The thickness of the first gap layer 19 preferably falls within the range of 5 to 60 nm, and may be 30 to 60 nm, for example. The first end face 15a of the main pole 15 has a side that is adjacent to the first gap layer 19, and the side defines the track width.

The plurality of magnetic path portions 42 (42A, 42B, 42C, and 42D) are located on the main pole 15 and away from the medium facing surface 70. The plurality of magnetic path portions 42 are arranged in proximity to each other and are not in contact with each other. The magnetic path portions 42A and 42B are disposed to sandwich a cross section that intersects the first end face 15a of the main pole 15 located in the medium facing surface 70 and that is perpendicular to the medium facing surface 70 and to the top surface 1a of the substrate 1 (this cross section will hereinafter be referred to as the main cross section). The magnetic path portions 42C and 42D are located farther from the medium facing surface 70 than are the magnetic path portions 42A and 42B, and sandwich the aforementioned main cross section. Both the magnetic path portions 42A and 42B are sectorial in planar shape (the shape in a plan view), so that the distance between the respective outer edges of the magnetic path portions 42A and 42B in the track width direction TW decreases with increasing proximity to the medium facing surface 70. Both the magnetic path portions 42C and 42D are rectangular in planar shape.

The write head unit 90 further includes a nonmagnetic layer 61 separating the plurality of magnetic path portions 42 from each other. The nonmagnetic layer 61 is made of an insulating nonmagnetic material. The material of the nonmagnetic layer 61 may be alumina, for example.

As shown in FIG. 5, the first portion 21 of the coil is wound approximately three turns around the plurality of magnetic path portions 42. The write head unit 90 further includes an insulating film 62 made of an insulating material and isolating the first portion 21 from the first shield 16A, the first gap layer 19 and the plurality of magnetic path portions 42, an insulating layer 63 made of an insulating material and disposed in the space between adjacent turns of the first portion 21, a nonmagnetic layer 64 made of a nonmagnetic material and disposed around the first portion 21 and the first shield 16A, and an insulating layer 65 made of an insulating material and disposed over the first portion 21, the insulating film 62 and the insulating layer 63. The insulating film 62 and the insulating layer 65 are made of alumina, for example. The insulating layer 63 is made of photoresist, for example. The nonmagnetic layer 64 is made of an inorganic insulating material, for example. The inorganic insulating material is alumina or silicon oxide, for example.

The yoke layer 41 is disposed over the first shield 16A, the plurality of magnetic path portions 42 and the insulating layer 65, and connects the first shield 16A and the plurality of magnetic path portions 42. The yoke layer 41 has an end face that faces toward the medium facing surface 70 and that is located at a distance from the medium facing surface 70. The distance from the medium facing surface 70 to an arbitrary point on the end face of the yoke layer 41 increases with increasing distance from the arbitrary point to the top surface 1a of the substrate 1. The write head unit 90 further includes an insulating layer 66 made of an insulating material and disposed around the yoke layer 41. The insulating layer 66 is made of alumina, for example.

The magnetic head further includes a protective layer 67 made of a nonmagnetic material and disposed to cover the write head unit 90. The protective layer 67 is made of, for example, an inorganic insulating material such as alumina.

As has been described, the magnetic head according to the present embodiment includes the medium facing surface 70 facing the recording medium 72, the read head unit 80, and the write head unit 90. The read head unit 80 and the write head unit 90 are stacked on the substrate 1. The read head unit 80 is located on the rear side in the direction T of travel of the recording medium 72 (i.e., the leading end side) relative to the write head unit 90.

The write head unit 90 includes the coil including the first portion 21 and the second portion 11, the main pole 15, and the return path section R. The return path section R is connected to the main pole 15 so that one or more spaces through which part of the coil passes is defined by the main pole 15 and the return path section R. In the present embodiment, in particular, first and second spaces S1 and S2 through which part of the coil passes are defined by the main pole 15 and the return path section R. This will be described in detail below.

The return path section R includes the write shield 16, the magnetic layers 31 to 36, the yoke layer 41, and the plurality of magnetic path portions 42. As shown in FIG. 2, the first shield 16A of the write shield 16, the yoke layer 41 and the plurality of magnetic path portions 42 are connected to the main pole 15 so that the first space S1 is defined by the main pole 15, the first shield 16A, the yoke layer 41 and the plurality of magnetic path portions 42. The first portion 21 of the coil passes through the first space S1. The plurality of magnetic path portions 42 separate a magnetic flux corresponding to the magnetic field produced by the first portion 21 into a plurality of fluxes so as to allow the fluxes to pass therethrough in parallel.

The second shield 16B of the write shield 16 and the magnetic layers 31 to 36 are connected to the main pole 15 so that the second space S2 is defined by the main pole 15, the second shield 16B and the magnetic layers 31 to 36. The second portion 11 of the coil passes through the second space S2.

Here, assume any cross section that intersects all of the plurality of magnetic path portions 42. There exist a plurality of such cross sections. In the present embodiment, the plurality of such cross sections include one or more cross sections perpendicular to the direction T of travel of the recording medium 72. FIG. 5 shows one cross section perpendicular to the direction T of travel of the recording medium 72. The plurality of magnetic path portions 42 intersect a cross section perpendicular to the direction T of travel of the recording medium 72, such as the cross section shown in FIG. 5.

In any cross section mentioned above, the distance between two adjacent magnetic path portions 42 is smaller than the minimum width of each of the two adjacent magnetic path portions 42, and only the nonmagnetic layer 61 is present between the two adjacent magnetic path portions 42. Hereinafter, this will be referred to as the requirement for the plurality of magnetic path portions 42 and the nonmagnetic layer 61.

The minimum width of a magnetic path portion 42 in any cross section mentioned above is defined as follows. First, assume two parallel straight lines that are in contact with the outer edges of a magnetic path portion 42 in any cross section mentioned above. There exist a plurality of pairs of such straight lines. The distance between the two straight lines of one of the plurality of pairs, the one of the plurality of pairs being the shortest in distance between the two straight lines, is the minimum width of the magnetic path portion 42.

Now, the requirement for the plurality of magnetic path portions 42 and the nonmagnetic layer 61 will be specifically described by taking the magnetic path portions 42A and 42C shown in FIG. 5 as an example. FIG. 5 illustrates the minimum width WA of the magnetic path portion 42A and the minimum width WC of the magnetic path portion 42C in the aforementioned cross section. In the aforementioned cross section, the distance D between the magnetic path portions 42A and 42C is smaller than the minimum width WA of the magnetic path portion 42A and the minimum width WC of the magnetic path portion 42C, and only the nonmagnetic layer 61 is present between the magnetic path portions 42A and 42C.

The above explanations on the magnetic path portions 42A and 42C also apply to any combinations of two adjacent magnetic path portions 42.

The write shield 16 captures a disturbance magnetic field applied to the magnetic head from the outside thereof. This makes it possible to prevent erroneous writing on the recording medium 72 induced by the disturbance magnetic field intensively captured into the main pole 15. The write shield 16 also has the function of capturing a magnetic flux produced from the first end face 15a of the main pole 15 and spreading in directions other than a direction perpendicular to the plane of the recording medium 72, so as to prevent the magnetic flux from reaching the recording medium 72. The return path section R has the function of allowing a magnetic flux that has been produced from the first end face 15a of the main pole 15 and has magnetized the recording medium 72 to flow back.

Now, the first portion 21 and the second portion 11 of the coil will be described in detail with reference to FIG. 4 and FIG. 5. FIG. 4 is a plan view showing the second portion 11. The second portion 11 includes a winding portion 11A disposed around the magnetic layer 33 which constitutes part of the return path section R, and a lead portion 11L contiguous with the winding portion 11A. In FIG. 4, the boundary between the winding portion 11A and the lead portion 11L is shown by a dotted line. The winding portion 11A is wound approximately three turns around the magnetic layer 33. The winding portion 11A has a coil connection part 11E electrically connected to the first portion 21. As viewed from above, the winding portion 11A is wound in a clockwise direction from the boundary between the winding portion 11A and the lead portion 11L toward the coil connection part 11E.

FIG. 5 is a plan view showing the first portion 21. The first portion 21 includes a winding portion 21A disposed around an assemblage of the plurality of magnetic path portions 42 which constitute part of the return path section R, and a lead portion 21L contiguous with the winding portion 21A. In FIG. 5, the boundary between the winding portion 21A and the lead portion 21L is shown by a dotted line. The winding portion 21A is wound approximately three turns around the assemblage of the plurality of magnetic path portions 42. The winding portion 21A has a coil connection part 21S electrically connected to the coil connection part 11E of the winding portion 11A of the second portion 11. When viewed from above, the winding portion 21A is wound in a counterclockwise direction from the coil connection part 21S toward the boundary between the winding portion 21A and the lead portion 21L.

The coil connection part 21S is electrically connected to the coil connection part 11E via a connection layer (not illustrated) that penetrates a plurality of layers interposed between the first portion 21 and the second portion 11. The connection layer is made of a conductive material such as copper. In the example shown in FIG. 4 and FIG. 5, the first portion 21 and the second portion 11 are connected in series. A magnetic flux corresponding to the magnetic field produced by the first portion 21 and a magnetic flux corresponding to the magnetic field produced by the second portion 11 pass through the return path section R and the main pole 15. Note that the first portion 21 and the second portion 11 may be connected in parallel.

The shape of the main pole 15 will now be described in detail with reference to FIG. 2, FIG. 4 and FIG. 5. As shown in FIG. 2, the main pole 15 has the first end face 15a, the top surface, and the bottom end. Further, as shown in FIG. 4 and FIG. 5, the main pole 15 includes a narrow portion 15A and a wide portion 15B. The narrow portion 15A has an end face located in the medium facing surface 70 and an end portion opposite to the end face. The wide portion 15B is connected to the end portion of the narrow portion 15A. The top surface of the main pole 15 includes the top surface of the narrow portion 15A and the top surface of the wide portion 15B. The top surface of the wide portion 15B is greater than the top surface of the narrow portion 15A in width in the track width direction TW.

The width of the top surface of the narrow portion 15A in the track width direction TW is generally constant regardless of the distance from the medium facing surface 70. The width of the top surface of the wide portion 15B in the track width direction TW is, for example, equal to that of the top surface of the narrow portion 15A at the boundary between the narrow portion 15A and the wide portion 15B, and gradually increases with increasing distance from the medium facing surface 70, then becoming constant. Here, the length of the narrow portion 15A in a direction perpendicular to the medium facing surface 70 (the Y direction) will be referred to as the neck height. The neck height falls within the range of 0 to 0.3 µm, for example. A zero neck height means that there is no narrow portion 15A and thus the wide portion 15B has an end face located in the medium facing surface 70.

The top surface of the main pole 15 includes a first portion and a second portion arranged in this order, the first portion being closer to the medium facing surface 70. The first portion has a first end located in the medium facing surface 70 and a second end opposite thereto. The second portion is connected to the second end of the first portion. The first portion is inclined such that its second end is located on the front side in the direction T of travel of the recording medium 72 relative to its first end. The second portion extends substantially in the direction perpendicular to the medium facing surface 70 (the Y direction). The bottom surface of the first shield 16A includes a portion that is opposed to the first portion of the top surface of the main pole 15 with the first gap layer 19 interposed therebetween.

The bottom end of the main pole 15 includes a third portion and a fourth portion arranged in this order, the third portion being closer to the medium facing surface 70. The third portion has a first end located in the medium facing surface 70 and a second end opposite thereto. The third portion may be an edge formed by two intersecting planes, or may be a plane connecting two planes to each other. The fourth portion is a plane connected to the second end of the third portion. The third portion is inclined such that its second end is located on the rear side in the direction T of travel of the recording medium 72 relative to its first end. The fourth portion extends substantially in the direction perpendicular to the medium facing surface 70 (the Y direction).

The first end face 15a of the main pole 15 has a first side adjacent to the first gap layer 19, a second side connected to one end of the first side, and a third side connected to the other end of the first side. The first side defines the track width. The position of an end of a record bit to be recorded on the recording medium 72 depends on the position of the first side. The width of the first end face 15a of the main pole 15 in the track width direction TW decreases with increasing distance from the first side, that is, with increasing proximity to the top surface 1a of the substrate 1. Each of the second side and the third side forms an angle of, for example, 7° to 17°, or preferably 10° to 15°, relative to a direction perpendicular to the top surface 1a of the substrate 1 (the Z direction). The first side has a length in the range of 0.05 to 0.20 µm, for example.

A description will now be given of the specific function and effects of the magnetic head according to the present embodiment. In the present embodiment, the return path section R includes the plurality of magnetic path portions 42 (42A to 42D), and the first portion 21 of the coil includes the winding portion 21A disposed around the assemblage of the plurality of magnetic path portions 42. According to the present embodiment, this makes it possible to inhibit a decrease of magnetic flux caused by the skin effect of magnetic flux while preventing an increase in the length of the magnetic path formed by the main pole 15 and the return path section R and an increase in the resistance of the coil. These effects will be described in detail below in comparison with a magnetic head of a first comparative example.

The configuration of the magnetic head of the first comparative example will be described first. The magnetic head of the first comparative example is provided with a flux concentrating portion that is formed of a single magnetic layer, in place of the four magnetic path portions 42A to 42D and the nonmagnetic layer 61 shown in FIG. 1 and FIG. 5. The shape and location of the flux concentrating portion are the same as those of an assemblage of the magnetic path portions 42A to 42D and the nonmagnetic layer 61, and the volume of the flux concentrating portion is equal to the total volume of the four magnetic path portions 42A to 42D and the nonmagnetic layer 61. The winding portion 21A is disposed around the flux concentrating portion. The remainder of configuration of the magnetic head of the first comparative example is the same as that of the magnetic head according to the present embodiment.

In the magnetic head of the first comparative example, the skin effect of magnetic flux becomes noticeable at the flux concentrating portion as the frequency of write signals is increased. More specifically, the magnetic flux density increases in the vicinity of the surface of the flux concentrating portion, whereas the magnetic flux density decreases inside the flux concentrating portion other than the vicinity of the surface thereof. This makes the problem noticeable that the magnetic path formed by the main pole 15 and the return path section R becomes unable to pass a large amount of magnetic flux therethrough.

To address this problem, it is conceivable to increase the cross-sectional area of the flux concentrating portion. However, an increase in the cross-sectional area of the flux concentrating portion leads to an increase in the size of the winding portion 21A and also an increase in the total length thereof. This causes an increase in the length of the magnetic path formed by the main pole 15 and the return path section R and an increase in the resistance of the coil.

The present embodiment is configured so that in any cross section that intersects all of the plurality of magnetic path portions 42, the distance between two adjacent magnetic path portions 42 is smaller than the minimum width of each of the two adjacent magnetic path portions 42, and only the nonmagnetic layer 61 is present between the two adjacent magnetic path portions 42. As a result, the total surface area of the plurality of magnetic path portions 42 is greater than the surface area of the flux concentrating portion of the first comparative example. Thus, when compared with the flux concentrating portion of the first comparative example, the plurality of magnetic path portions 42 are higher in the ratio of the flux-increasing portion in the vicinity of the surface to the flux-decreasing portion other than the vicinity of the surface. Thus, according to the present embodiment, it is possible to allow a greater amount of magnetic flux to pass through the plurality of magnetic path portions 42 than through the flux concentrating portion of the first comparative example, without increasing the cross-sectional area of the plurality of magnetic path portions 42. Consequently, the present embodiment makes it possible to inhibit a decrease of magnetic flux caused by the skin effect of magnetic flux while preventing an increase in the length of the magnetic path formed by the main pole 15 and the return path section R and an increase in the resistance of the coil.

If, in any cross section that intersects all of the plurality of magnetic path portions 42, the distance between two adjacent magnetic path portions 42 is equal to or greater than the minimum width of each of the two adjacent magnetic path portions 42, the total surface area of the plurality of magnetic path portions 42 may be no greater than the surface area of the flux concentrating portion of the first comparative example. Thus, the present embodiment requires that in any cross section mentioned above, the distance between two adjacent magnetic path portions 42 should be smaller than the minimum width of each of the two adjacent magnetic path portions 42.

Modification Examples

Figure 6:
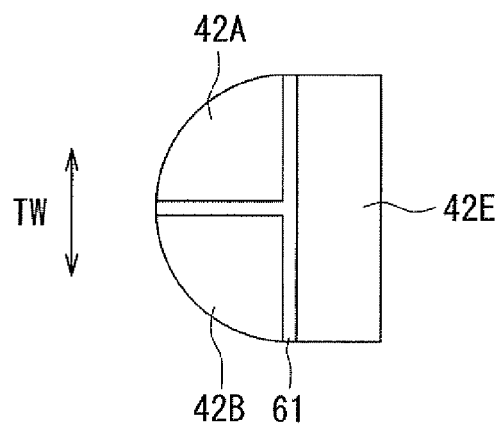
FIG. 6 is a plan view showing a first modification example of a plurality of magnetic path portions of the first embodiment of the invention.

First to fifth modification examples of the plurality of magnetic path portions 42 of the present embodiment will now be described. FIG. 6 is a plan view showing the first modification example of the plurality of magnetic path portions 42. In the first modification example, the return path section R includes three magnetic path portions 42A, 42B, and 42E as the plurality of magnetic path portions 42. The magnetic path portions 42A and 42B are shaped and disposed in the same manner as the magnetic path portions 42A and 42B shown in FIG. 1 and FIG. 5. The magnetic path portion 42E is farther from the medium facing surface 70 than are the magnetic path portions 42A and 42B, and disposed to intersect the main cross section. The planar shape of the magnetic path portion 42E is a rectangle that is elongated in the track width direction TW.

Figure 7:
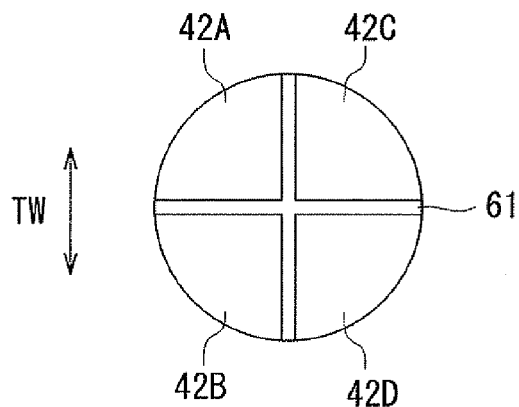
FIG. 7 is a plan view showing a second modification example of the plurality of magnetic path portions of the first embodiment of the invention.

FIG. 7 is a plan view showing the second modification example of the plurality of magnetic path portions 42. In the second modification example, the return path section R includes four magnetic path portions 42A, 42B, 42C, and 42D as the plurality of magnetic path portions 42. The magnetic path portions 42A and 42B are shaped and disposed in the same manner as the magnetic path portions 42A and 42B shown in FIG. 1 and FIG. 5, while the magnetic path portions 42C and 42D are disposed in the same manner as the magnetic path portions 42C and 42D shown in FIG. 1 and FIG. 5. Both the magnetic path portions 42C and 42D are sectorial in planar shape, so that the distance between the respective outer edges of the magnetic path portions 42C and 42D in the track width direction TW decreases with increasing distance from the medium facing surface 70 (see FIG. 5). In the second modification example, an assemblage of the magnetic path portions 42A to 42D and the nonmagnetic layer 61 is circular in planar shape, in particular.

Figure 8:
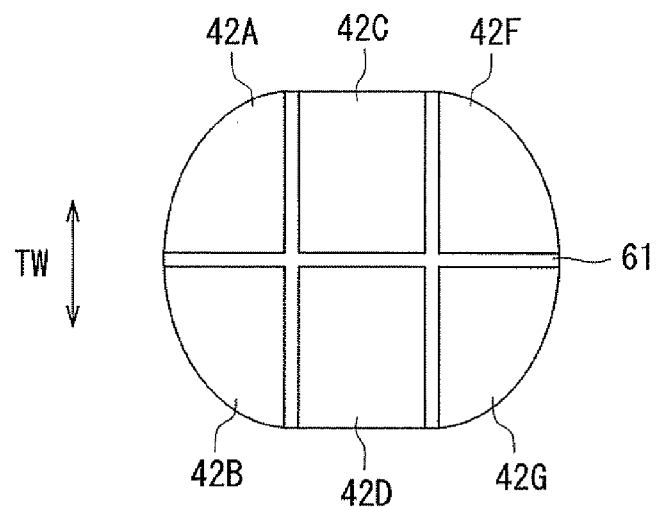
FIG. 8 is a plan view showing a third modification example of the plurality of magnetic path portions of the first embodiment of the invention.

FIG. 8 is a plan view showing the third modification example of the plurality of magnetic path portions 42. In the third modification example, the return path section R includes six magnetic path portions 42A, 42B, 42C, 42D, 42F, and 42G as the plurality of magnetic path portions 42. The magnetic path portions 42A to 42D are shaped and disposed in the same manner as the magnetic path portions 42A to 42D shown in FIG. 1 and FIG. 5. The magnetic path portions 42F and 42G are farther from the medium facing surface 70 than are the magnetic path portions 42C and 42D, and disposed to sandwich the main cross section. Both the magnetic path portions 42F and 42G are sectorial in planar shape, so that the distance between the respective outer edges of the magnetic path portions 42F and 42G in the track width direction TW decreases with increasing distance from the medium facing surface 70 (see FIG. 5).

Figure 9:
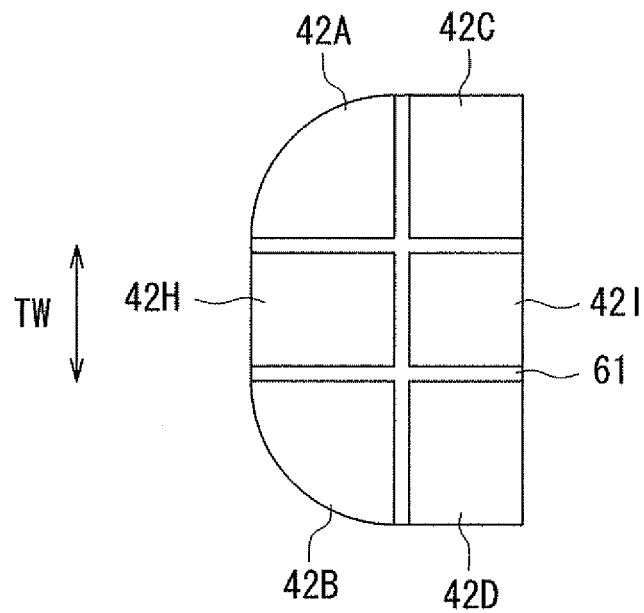
FIG. 9 is a plan view showing a fourth modification example of the plurality of magnetic path portions of the first embodiment of the invention.

FIG. 9 is a plan view showing the fourth modification example of the plurality of magnetic path portions 42. In the fourth modification example, the return path section R includes six magnetic path portions 42A, 42B, 42C, 42D, 42H, and 42I as the plurality of magnetic path portions 42. The magnetic path portion 42H is disposed to intersect the main cross section. The magnetic path portion 42I is farther from the medium facing surface 70 than is the magnetic path portion 42H, and disposed to intersect the main cross section. The magnetic path portions 42A and 42B are disposed on opposite sides of the magnetic path portion 42H in the track width direction TW. The magnetic path portions 42C and 42D are disposed on opposite sides of the magnetic path portion 42I in the track width direction TW. The magnetic path portions 42A to 42D are shaped in the same manner as the magnetic path portions 42A to 42D shown in FIG. 1 and FIG. 5. Both the magnetic path portions 42H and 42I are rectangular in planar shape.

Figure 10:
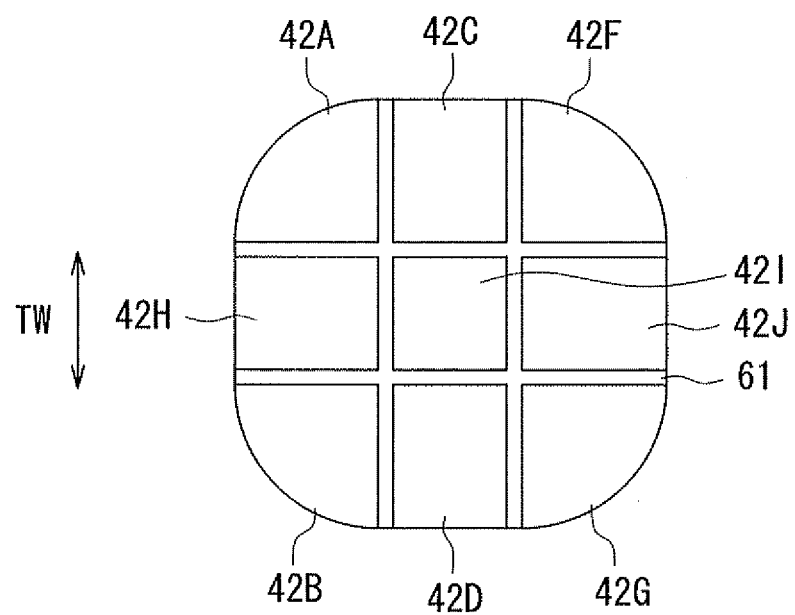
FIG. 10 is a plan view showing a fifth modification example of the plurality of magnetic path portions of the first embodiment of the invention.

FIG. 10 is a plan view showing the fifth modification example of the plurality of magnetic path portions 42. In the fifth modification example, the return path section R includes nine magnetic path portions 42A, 42B, 42C, 42D, 42F, 42G, 42H, 42I, and 42J as the plurality of magnetic path portions 42. The magnetic path portions 42A to 42D, 42H, and 42I are shaped and disposed in the same manner as the magnetic path portions 42A to 42D, 42H, and 42I of the fourth modification example shown in FIG. 9. The magnetic path portion 42J is farther from the medium facing surface 70 than is the magnetic path portion 42I, and disposed to intersect the main cross section. The magnetic path portions 42F and 42G are disposed on opposite sides of the magnetic path portion 42J in the track width direction TW. The magnetic path portions 42F and 42G are shaped in the same manner as the magnetic path portions 42F and 42G of the third modification example shown in FIG. 8. The magnetic path portion 42J is rectangular in planar shape.

Second Embodiment

Figure 11:
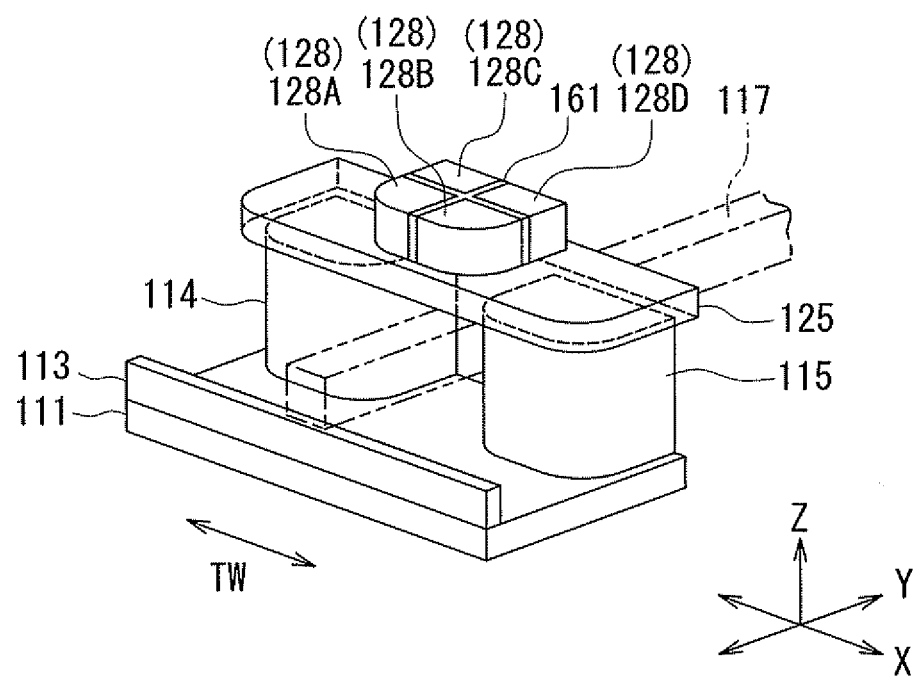
FIG. 11 is a perspective view showing the main part of a magnetic head according to a second embodiment of the invention.
Figure 12:
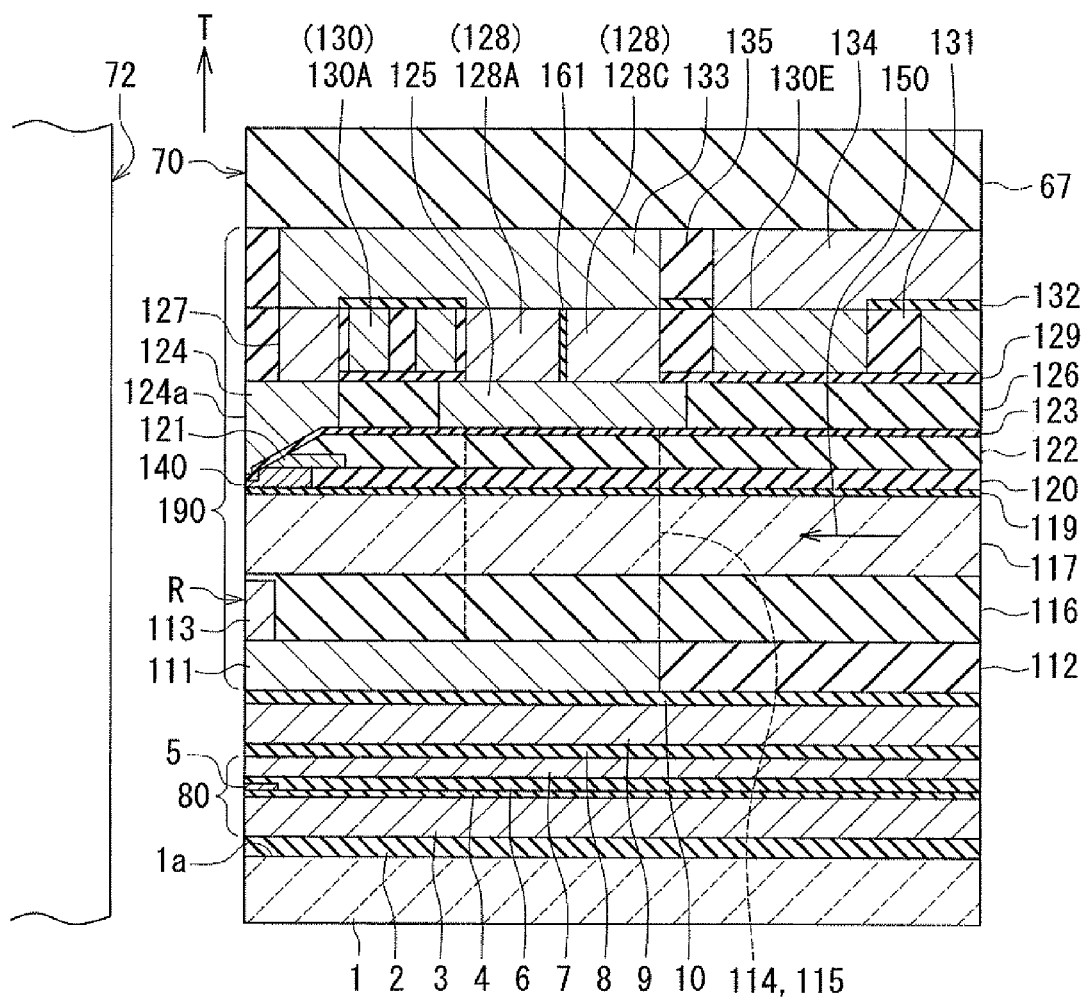
FIG. 12 is a cross-sectional view showing the configuration of the magnetic head according to the second embodiment of the invention.
Figure 13:
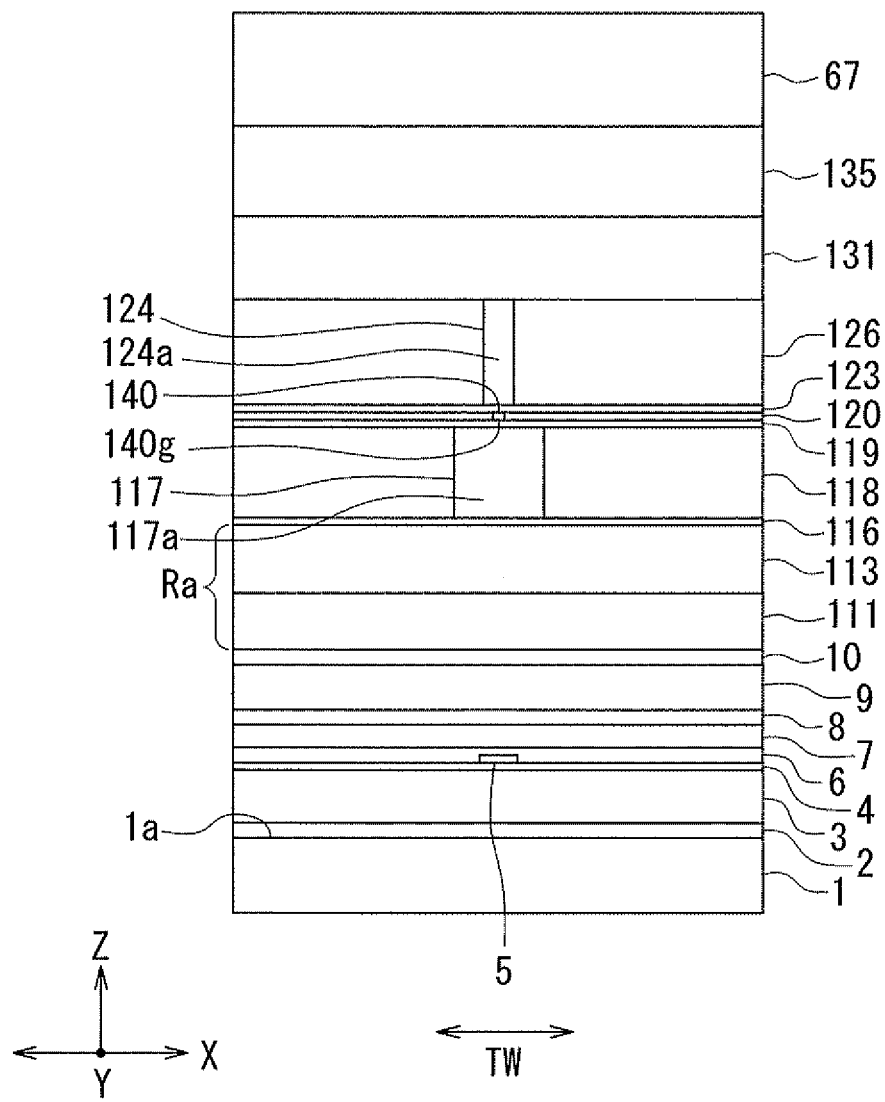
FIG. 13 is a front view showing the medium facing surface of the magnetic head according to the second embodiment of the invention.
Figure 14:
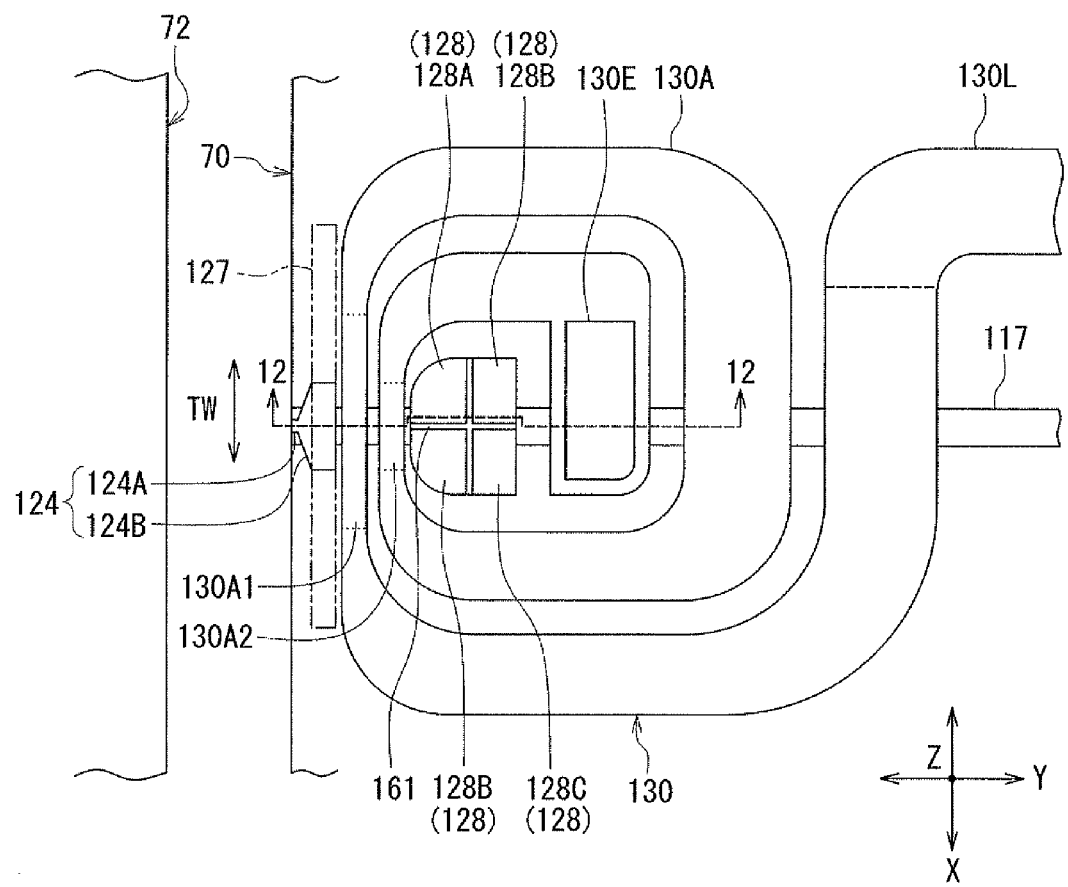
FIG. 14 is a plan view showing a coil of the second embodiment of the invention.
Figure 15:
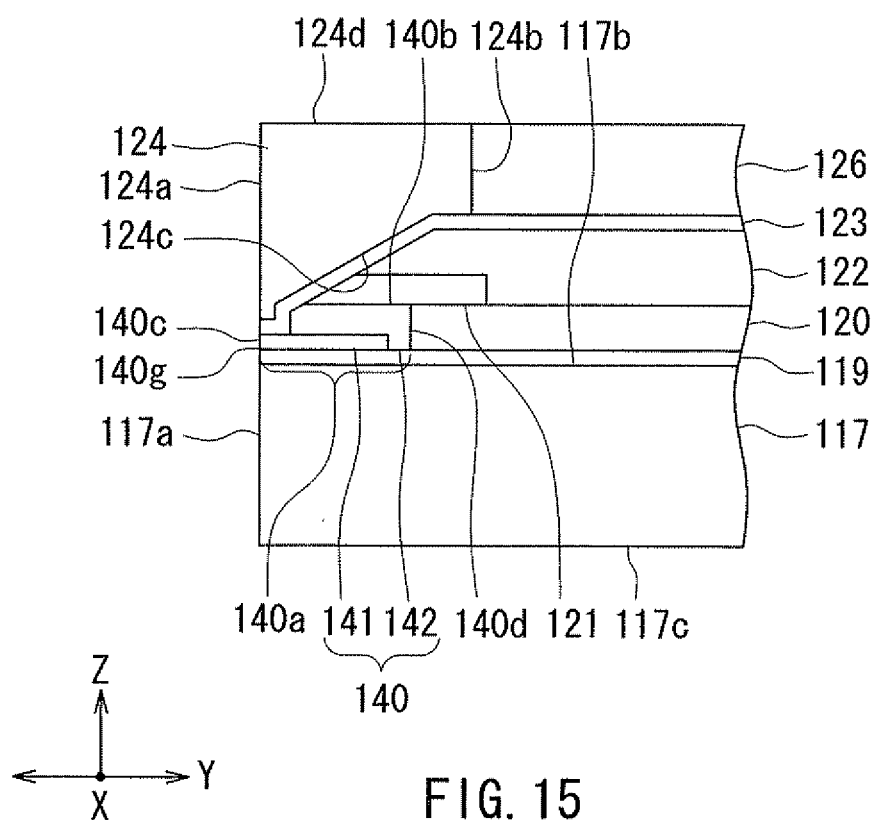
FIG. 15 is a cross-sectional view showing a core, a plasmon generator, and a main pole of the second embodiment of the invention.

A second embodiment of the present invention will now be described with reference to FIG. 11 to FIG. 15. FIG. 11 is a perspective view showing the main part of the magnetic head according to the present embodiment. FIG. 12 is a cross-sectional view showing the configuration of the magnetic head according to the present embodiment. FIG. 13 is a front view showing the medium facing surface of the magnetic head according to the present embodiment. FIG. 14 is a plan view showing the coil of the present embodiment. FIG. 15 is a cross-sectional view showing a core, a plasmon generator, and a main pole of the present embodiment. Note that FIG. 12 shows a cross section taken at the position indicated by line 12-12 of FIG. 14.

The magnetic head according to the present embodiment is for use in thermally-assisted magnetic recording. Thermally-assisted magnetic recording uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization.

The magnetic head according to the present embodiment has a write head unit 190 in place of the write head unit 90 of the first embodiment. The write head unit 190 is disposed on the nonmagnetic layer 10. The write head unit 190 includes a coil 130, a main pole 124, and a return path section R. The coil 130, the main pole 124 and the return path section R are made of materials the same as those used for the coil, the main pole 15 and the return path section R of the first embodiment.

The coil 130 produces a magnetic field corresponding to data to be written on the recording medium 72. The main pole 124 has a first end face 124a located in the medium facing surface 70. The main pole 124 allows a magnetic flux corresponding to the magnetic field produced by the coil 130 to pass, and produces a write magnetic field for writing data on the recording medium 72 by means of the perpendicular magnetic recording system.

The return path section R has a second end face Ra located in the medium facing surface 70. The return path section R is connected to the main pole 124 so that a space is defined by the main pole 124 and the return path section R. Part of the coil 130 passes through the space. Further, the return path section R includes magnetic layers 111, 113, 127 and 133, a first columnar portion 114, a second columnar portion 115, a coupling portion 125, and a plurality of magnetic path portions.

The plurality of magnetic path portions may be configured in the same manner as the plurality of magnetic path portions 42 (the magnetic path portions 42A to 42D) of the first embodiment shown in FIG. 1 and FIG. 5, or as any one of the first to fifth modification examples, shown in FIG. 6 to FIG. 10, from the plurality of magnetic path portions 42 of the first embodiment. In the example shown in FIG. 11 and FIG. 14, the return path section R includes four magnetic path portions 128A, 128B, 128C, and 128D, as the plurality of magnetic path portions. The magnetic path portions 128A and 128B are disposed to sandwich the main cross section of the present embodiment, i.e., the cross section that intersects the first end face 124a of the main pole 124 located in the medium facing surface 70 and that is perpendicular to the medium facing surface 70 and to the top surface 1a of the substrate 1. The magnetic path portions 128C and 128D are farther from the medium facing surface 70 than are the magnetic path portions 128A and 128B, and disposed to sandwich the main cross section. The magnetic path portions 128A to 128D are shaped in the same manner as the magnetic path portions 42A to 42D of the first embodiment, respectively. Hereinafter, any magnetic path portion in the present embodiment will be represented by reference numeral 128.

The magnetic layer 111 is located on the magnetic layer 10. The magnetic layer 113 is located on the magnetic layer 111 in the vicinity of the medium facing surface 70. The first and second columnar portions 114 and 115 are located on the magnetic layer 111 and away from the medium facing surface 70.

The magnetic layers 111 and 113 each have an end face located in the medium facing surface 70. The second end face Ra of the return path section R is composed of the end face of the magnetic layer 111 and the end face of the magnetic layer 113. The first end face 124a of the main pole 124 and the second end face Ra are located at positions different from each other in the direction T of travel of the recording medium 72. In the present embodiment, the second end face Ra is located on the rear side in the direction T of travel of the recording medium 72 relative to the first end face 124a.

The write head unit 190 further includes an insulating layer 112 located on the nonmagnetic layer 10 and surrounding the magnetic layer 111. The insulating layer 112 is made of alumina, for example.

The write head unit 190 further includes a waveguide. The waveguide includes a core 117 through which light propagates, and a cladding provided around the core 117. As shown in FIG. 15, in particular, the core 117 has an end face 117a closer to the medium facing surface 70, an evanescent light generating surface 117b serving as a top surface, a bottom surface 117c, and two side surfaces. The end face 117a may be located in the medium facing surface 70 or away from the medium facing surface 70. FIG. 11 to FIG. 15 show an example in which the end face 117a is located in the medium facing surface 70.

The cladding includes cladding layers 116, 118 and 119. The cladding layer 116 is disposed to cover the magnetic layers 111 and 113 and the insulating layer 112. The core 117 lies on the cladding layer 116. The cladding layer 118 lies on the cladding layer 116 and surrounds the core 117. The cladding layer 119 is disposed over the evanescent light generating surface 117b of the core 117 and the top surface of the cladding layer 118.

The core 117 is made of a dielectric material that transmits laser light to be used for generating near-field light. Laser light that is emitted from a laser diode, not illustrated, enters the core 117 and propagates through the core 117. The cladding layers 116, 118 and 119 are each made of a dielectric material that has a refractive index lower than that of the core 117. For example, the core 117 may be made of tantalum oxide such as $Ta_2O_5$ or silicon oxynitride (SiON), whereas the cladding layers 116, 118 and 119 may be made of silicon dioxide ($SiO_2$) or alumina.

Parts of the first and second columnar portions 114 and 115 are embedded in the cladding layers 116, 118 and 119. The first columnar portion 114 and the second columnar portion 115 are located on opposite sides of the core 117 in the track width direction TW (the X direction) and are each spaced from the core 117.

The write head unit 190 further includes a plasmon generator 140 disposed on the cladding layer 119 to be situated above the evanescent light generating surface 117b of the core 117 in the vicinity of the medium facing surface 70, and a dielectric layer 120 disposed on the cladding layer 119 and surrounding the plasmon generator 140. The plasmon generator 140 is configured to excite surface plasmons on the principle to be described later. The plasmon generator 140 is made of, for example, one of Au, Ag, Al, Cu, Pd, Pt, Rh and Ir, or an alloy composed of two or more of these elements. The dielectric layer 120 is made of the same material as the cladding layers 116, 118 and 119, for example. The shape of the plasmon generator 140 will be described in detail later.

The write head unit 190 further includes a nonmagnetic metal layer 121 disposed on the plasmon generator 140 and the dielectric layer 120, and a dielectric layer 122 disposed on the dielectric layer 120 and the nonmagnetic metal layer 121. Each of the nonmagnetic metal layer 121 and the dielectric layer 122 has an end face facing toward the medium facing surface 70 and located at a distance from the medium facing surface 70. The distance from the medium facing surface 70 to an arbitrary point on the end face of each of the nonmagnetic metal layer 121 and the dielectric layer 122 increases with increasing distance from the arbitrary point to the top surface 1a of the substrate 1. The nonmagnetic metal layer 121 functions as a heat sink for dissipating heat generated at the plasmon generator 140 outward from the plasmon generator 140. The nonmagnetic metal layer 121 is made of Ru, for example. The dielectric layer 122 is made of the same material as the cladding layers 116, 118 and 119, for example.

The write head unit 190 further includes an insulating layer 123 disposed over the plasmon generator 140, the nonmagnetic metal layer 121 and the dielectric layer 122. The remaining parts of the first and second columnar portions 114 and 115 are embedded in the dielectric layers 120 and 122 and the insulating layer 123. The insulating layer 123 is made of alumina, for example.

The coupling portion 125 lies on the first and second columnar portions 114 and 115 and the insulating layer 123. The coupling portion 125 couples the first and second columnar portions 114 and 115 to each other. The plurality of magnetic path portions 128 are connected to the coupling portion 125, being disposed such that the coupling portion 125 is interposed between the core 117 and the magnetic path portions 128. As shown in FIG. 11, an assemblage of the plurality of magnetic path portions 128 is smaller than the coupling portion 125 in width in the track width direction TW.

The plurality of magnetic path portions 128 are arranged in proximity to each other and are not in contact with each other. The write head unit 190 further includes a nonmagnetic layer 161 separating the plurality of magnetic path portions 128 from each other. The nonmagnetic layer 161 is made of the same material as the nonmagnetic layer 61 of the first embodiment.

The main pole 124 is disposed on the insulating layer 123 such that the plasmon generator 140 is interposed between the core 117 and the main pole 124. The magnetic layer 127 is disposed on the main pole 124. The magnetic layer 127 has a front end face facing toward the medium facing surface 70 and a rear end face opposite thereto. The front end face of the magnetic layer 127 is located at a distance from the medium facing surface 70. The shape of the main pole 124 will be described in detail later.

The write head unit 190 further includes an insulating layer 126 disposed around the main pole 124 and the coupling portion 125. The top surfaces of the main pole 124, the coupling portion 125 and the insulating layer 126 are even with each other. The insulating layer 126 is made of alumina, for example.

The write head unit 190 further includes an insulating layer 129 disposed on a part of the top surface of the coupling portion 125 and the top surface of the insulating layer 126 and surrounding the magnetic layer 127 and the plurality of magnetic path portions 128. The coil 130 is disposed on the insulating layer 129. As shown in FIG. 14, the coil 130 is wound approximately two turns around the plurality of magnetic path portions 128. The insulating layer 129 is made of alumina, for example. The shape and location of the coil 130 will be described in detail later.

The write head unit 190 further includes an insulating layer 131 disposed in the space between adjacent turns of the coil 130 and around the magnetic layer 127, the plurality of magnetic path portions 128 and the coil 130, and an insulating layer 132 disposed over the coil 130 and the insulating layer 131. The insulating layers 131 and 132 are made of alumina, for example.

The magnetic layer 133 lies on the magnetic layer 127, the plurality of magnetic path portions 128 and the insulating layer 132, and magnetically couples the magnetic layer 127 and the plurality of magnetic path portions 128. The magnetic layer 113, the magnetic layer 111, the columnar portions 114 and 115, the coupling portion 125, the plurality of magnetic path portions 128, the magnetic layers 133 and 127, and the main pole 124 form a magnetic path for passing a magnetic flux corresponding to the magnetic field produced by the coil 130.

The write head unit 190 further includes a lead layer 134 that is located farther from the medium facing surface 70 than is the magnetic layer 133 and lies on the insulating layer 132. The lead layer 134 is used for energizing the coil 130, penetrates the insulating layer 132 and is electrically connected to the coil 130. The lead layer 134 is made of a conductive material such as copper.

The write head unit 190 further includes an insulating layer 135 disposed around the magnetic layer 133 and the lead layer 134. The protective layer 67 of the present embodiment is disposed to cover the magnetic layer 133, the lead layer 134 and the insulating layer 135. The insulating layer 135 is made of alumina, for example.

The shape and location of the coil 130 will now be described in detail with reference to FIG. 14. The coil 130 includes a winding portion 130A disposed around the assemblage of the plurality of magnetic path portions 128 constituting part of the return path section R, and a lead portion 130L contiguous with the winding portion 130A. In FIG. 14, the boundary between the winding portion 130A and the lead portion 130L is shown by a broken line. The winding portion 130A is wound approximately two turns around the assemblage of the plurality of magnetic path portions 128. The winding portion 130A has a coil connection part 130E electrically connected to the lead layer 134. As viewed from above, the winding portion 130A is wound in a clockwise direction from the boundary between the winding portion 130A and the lead portion 130L toward the coil connection part 130E.

The location of the lead layer 134 is not limited to the example shown in FIG. 12. For example, the lead layer 134 may be located on the insulating layer 123. In this case, the coil connection part 130E of the winding portion 130A penetrates the insulating layer 129 and is electrically connected to the lead layer 134.

As shown in FIG. 14, the winding portion 130A further has two conductor portions (hereinafter referred to as linear conductor portions) 130A1 and 130A2 interposed between the medium facing surface 70 and the plurality of magnetic path portions 128 and extending linearly in parallel to the medium facing surface 70. The linear conductor portions 130A1 and 130A2 are aligned in this order in the direction perpendicular to the medium facing surface 70 (the Y direction), the linear conductor portion 130A1 being closer to the medium facing surface 70. Each of the linear conductor portions 130A1 and 130A2 has a constant width in the direction perpendicular to the medium facing surface 70. In FIG. 14, the positions of opposite ends of each of the linear conductor portions 130A1 and 130A2 in the track width direction TW (the X direction) are shown by dotted lines. This also applies to other drawings that show other linear conductor portions.

An example of the shape of the plasmon generator 140 will now be described with reference to FIG. 15. The plasmon generator 140 has a plasmon exciting part 140a serving as a bottom surface, a top surface 140b, a front end face 140c located in the medium facing surface 70, and a rear end face 140d opposite to the front end face 140c. The plasmon exciting part 140a is opposed to the evanescent light generating surface 117b of the core 117 with a predetermined spacing therebetween. The cladding layer 119 is interposed between the evanescent light generating surface 117b and the plasmon exciting part 140a. For example, the plasmon generator 140 is rectangular in cross section parallel to the medium facing surface 70.

The front end face 140c has a near-field light generating part 140g located at the front extremity of the plasmon exciting part 140a. The near-field light generating part 140g is located between the first end face 124a of the main pole 124 and the second end face Ra of the return path section R. The near-field light generating part 140g generates near-field light on the principle to be described later.

As shown in FIG. 15, the plasmon generator 140 includes a first layer 141 located in the vicinity of the medium facing surface 70 and a second layer 142 disposed to cover the first layer 141. The first layer 141 has a front end face located in the medium facing surface 70 and a bottom surface opposed to the evanescent light generating surface 117b of the core 117. The front end face of the first layer 141 also serves as the front end face 140c of the plasmon generator 140.

Although not illustrated, the first layer 141 includes a narrow portion located in the vicinity of the medium facing surface 70 and a wide portion that is located farther from the medium facing surface 70 than is the narrow portion. The narrow portion has a front end face located in the medium facing surface 70. The front end face of the narrow portion also serves as the front end face of the first layer 141 and as the front end face 140c of the plasmon generator 140. The width of the narrow portion in the direction parallel to the medium facing surface 70 and to the top surface 1a of the substrate 1 (the X direction) may be constant regardless of the distance from the medium facing surface 70 or may decrease with increasing proximity to the medium facing surface 70. The wide portion is located on a side of the narrow portion farther from the front end face 140c and is coupled to the narrow portion. The width of the wide portion is the same as that of the narrow portion at the boundary between the narrow portion and the wide portion, and increases with increasing distance from the narrow portion.

The width (the dimension in the track width direction TW) of the front end face 140c is defined by the width of the first layer 141 in the medium facing surface 70. The width of the front end face 140c falls within the range of 5 to 40 nm, for example. The height (the dimension in the Z direction) of the front end face 140c is defined by the height of the first layer 141 in the medium facing surface 70. The height of the front end face 140c falls within the range of 5 to 40 nm, for example.

The second layer 142 is larger than the wide portion of the first layer 141 in planar shape, and covers a part of the first layer 141 away from the medium facing surface 70. The second layer 142 has a front end face facing toward the medium facing surface 70, a bottom surface opposed to the evanescent light generating surface 117b of the core 117, a top surface, and a connecting surface connecting the front end face and the top surface to each other. The front end face of the second layer 142 is located at a distance from the medium facing surface 70. The distance from the medium facing surface 70 to an arbitrary point on the connecting surface of the second layer 142 increases with increasing distance from the arbitrary point to the top surface 1a of the substrate 1. The plasmon exciting part 140a is composed of the bottom surface of the first layer 141 and the bottom surface of the second layer 142.

An example of the shape of the main pole 124 will now be described with reference to FIG. 14 and FIG. 15. The main pole 124 has the first end face 124a, and further has a rear end face 124b opposite to the first end face 124a, a bottom surface 124c, a top surface 124d, and two side surfaces. The bottom surface 124c is opposed to part of the top surface 140b of the plasmon generator 140 with the insulating layer 123 interposed therebetween. The distance from the top surface 1a of the substrate 1 to an arbitrary point on the bottom surface 124c increases with increasing distance from the arbitrary point to the medium facing surface 70.

As shown in FIG. 14, the main pole 124 includes a narrow portion 124A and a wide portion 124B. The narrow portion 124A has an end face located in the medium facing surface 70 and an end portion opposite to the end face. The wide portion 124B is connected to the end portion of the narrow portion 124A. The narrow portion 124A and the wide portion 124B are shaped in the same manner as the narrow portion 15A and the wide portion 15B of the main pole 15 of the first embodiment.

The distance between the bottom surface 124c of the main pole 124 and the evanescent light generating surface 117b of the core 117 increases with increasing distance from the medium facing surface 70. The present embodiment thus makes it possible to prevent the light propagating through the core 117 from being absorbed in part by the main pole 124 and to prevent the surface plasmons excited on the plasmon exciting part 140a from being absorbed in part by the main pole 124.

Now, the principle of generation of near-field light in the present embodiment and the principle of thermally-assisted magnetic recording using the near-field light will be described in detail. Laser light emitted from a laser diode that is not illustrated enters the core 117. As shown in FIG. 12, the laser light 150 propagates through the core 117 toward the medium facing surface 70, and reaches the vicinity of the plasmon generator 140. The evanescent light generating surface 117b of the core 117 generates evanescent light based on the laser light 150 propagating through the core 117. More specifically, the laser light 150 is totally reflected at the evanescent light generating surface 117b, and the evanescent light generating surface 117b thereby generates evanescent light which permeates into the cladding layer 119. In the plasmon generator 140, surface plasmons are excited on the plasmon exciting part 140a through coupling with the aforementioned evanescent light. The surface plasmons propagate to the near-field light generating part 140g, and the near-field light generating part 140g generates near-field light based on the surface plasmons.

The near-field light generated from the near-field light generating part 140g is projected toward the recording medium 72, reaches the surface of the recording medium 72 and heats a part of the magnetic recording layer of the recording medium 72. This lowers the coercivity of the part of the magnetic recording layer. In thermally-assisted magnetic recording, the part of the magnetic recording layer with the lowered coercivity is subjected to a write magnetic field produced by the main pole 124 for data writing.

A description will now be given of the specific function and effects of the magnetic head according to the present embodiment. In the present embodiment, the near-field light generating part 140g of the plasmon generator 140 is located between the first end face 124a of the main pole 124 and the second end face Ra of the return path section R. Part of the core 117 is located in the vicinity of the plasmon generator 140. The core 117 and the return path section R are configured to intersect each other without contacting each other. Specifically, in the present embodiment, the return path section R includes the first and second columnar portions 114 and 115, the coupling portion 125, and the plurality of magnetic path portions 128. The core 117 passes between the first and second columnar portions 114 and 115 without contacting the first and second columnar portions 114 and 115.

The coupling portion 125 couples the first and second columnar portions 114 and 115 to each other. The coupling portion 125 thus has a width of a certain magnitude in the track width direction TW (the X direction). The assemblage of the plurality of magnetic path portions 128 is smaller than the coupling portion 125 in width in the track width direction TW. The coil 130 includes the winding portion 130A wound around the assemblage of the plurality of magnetic path portions 128. According to the present embodiment, it is thus possible to bring the first and second columnar portions 114 and 115 closer to the medium facing surface 70 and reduce the entire length of the coil 130. This advantageous effect will now be described in detail in comparison with a magnetic head of a second comparative example.

Figure 16:
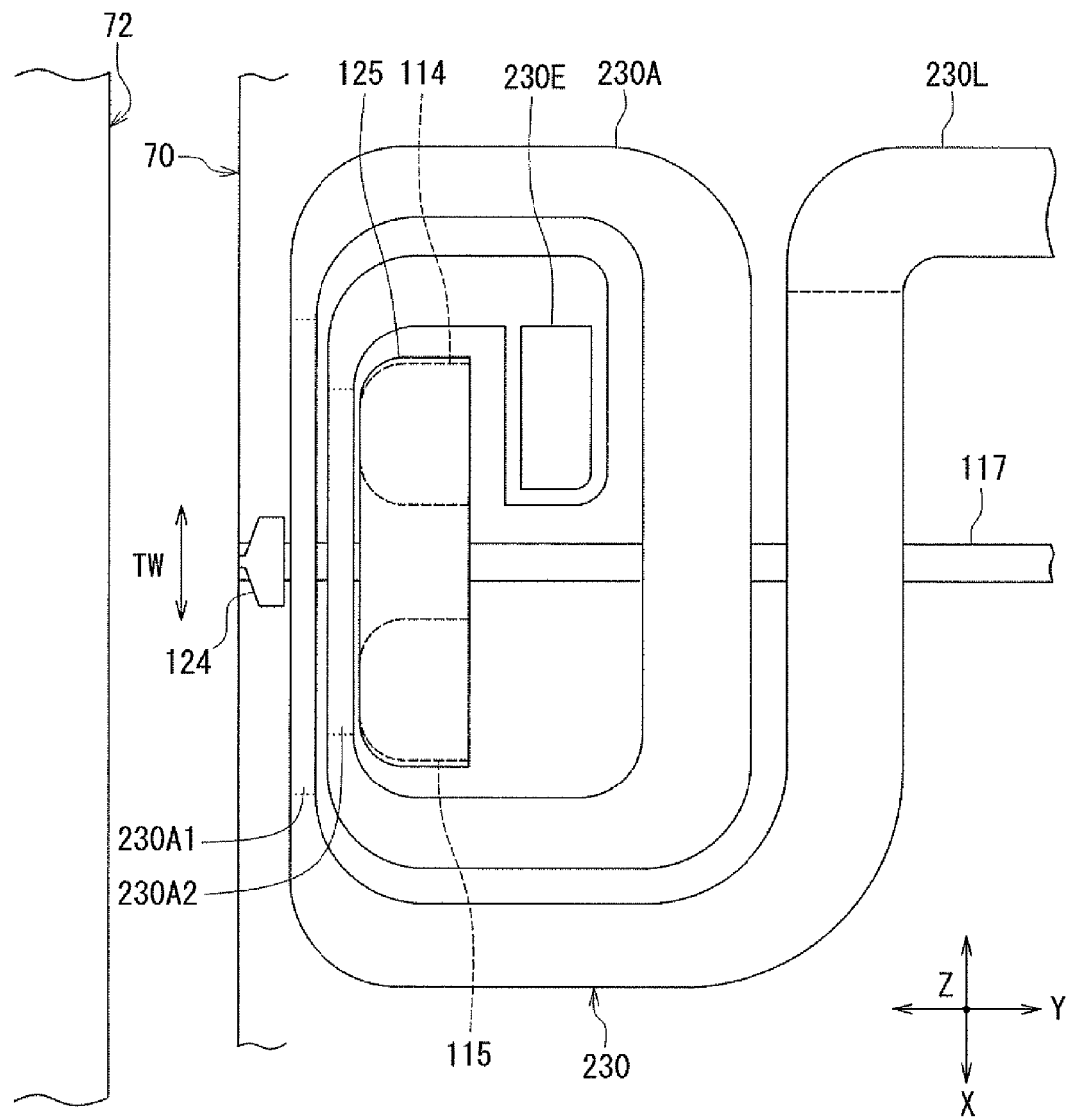
FIG. 16 is a plan view showing a coil of a magnetic head of a second comparative example.

First, the configuration of the magnetic head of the second comparative example will be described with reference to FIG. 16. FIG. 16 is a plan view showing the coil of the magnetic head of the second comparative example. The magnetic head of the second comparative example has none of the magnetic layer 127, the plurality of magnetic path portions 128 and the nonmagnetic layer 161. The main pole 124 and the coupling portion 125 are coupled by the magnetic layer 133. Further, the magnetic head of the second comparative example has a coil 230 in place of the coil 130 of the present embodiment. The coil 230 includes a winding portion 230A disposed around the coupling portion 125, and a lead portion 230L contiguous with the winding portion 230A. In FIG. 16, the boundary between the winding portion 230A and the lead portion 230L is shown by a broken line. The winding portion 230A is wound approximately two turns around the coupling portion 125.

Further, as shown in FIG. 16, the winding portion 230A has a coil connection part 230E electrically connected to the lead layer 134, and two linear conductor portions 230A1 and 230A2 interposed between the coupling portion 125 and the medium facing surface 70 and extending linearly in parallel to the medium facing surface 70. The linear conductor portions 230A1 and 230A2 are aligned in this order in the direction perpendicular to the medium facing surface 70 (the Y direction), the linear conductor portion 230A1 being closer to the medium facing surface 70. Each of the linear conductor portions 230A1 and 230A2 has a constant width in the direction perpendicular to the medium facing surface 70. As viewed from above, the winding portion 230A is wound in a clockwise direction from the boundary between the winding portion 230A and the lead portion 230L toward the coil connection part 230E. The remainder of the configuration of the magnetic head of the second comparative example is the same as that of the magnetic head according to the present embodiment.

As shown in FIG. 16, the width of the coupling portion 125 in the track width direction TW (the X direction) is equal to or greater than the distance between the respective outer ends of the first and second columnar portions 114 and 115 in the track width direction TW, and is thus comparatively great. In the magnetic head of the second comparative example, the winding portion 230A is great in entire length since it is wound around the coupling portion 125. As a result, the winding portion 230A has a high resistance and thus has a high heating value. This causes components around the winding portion 230A to expand, thus causing part of the medium facing surface 70 to protrude toward the recording medium 72 and become more likely to collide with the recording medium 72. In order to prevent this, the distance between the medium facing surface 70 and the recording medium 72 could be increased. However, this would lead to deterioration in write characteristics such as the overwrite property or to an increase in error rate.

On the other hand, in order to improve the write characteristics in a high frequency band, it is desirable to reduce the length of the magnetic path formed by the main pole 124 and the return path section R. To that end, it is effective to bring the first and second columnar portions 114 and 115 closer to the medium facing surface 70. If the first and second columnar portions 114 and 115 are brought closer to the medium facing surface 70 in the magnetic head of the second comparative example, the coupling portion 125 is also located closer to the medium facing surface 70, so that the linear conductor portions 230A1 and 230A2 interposed between the coupling portion 125 and the medium facing surface 70 become narrow and long. This makes the winding portion 230A higher in resistance, thus causing the aforementioned various problems to occur noticeably.

In contrast, in the present embodiment, the winding portion 130A of the coil 130 is wound around the assemblage of the plurality of magnetic path portions 128. The width of the assemblage of the plurality of magnetic path portions 128 in the track width direction TW is smaller than that of the coupling portion 125 which couples the first and second columnar portions 114 and 115 to each other. Consequently, the linear conductor portions 130A1 and 130A2 of the winding portion 130A are smaller than the linear conductor portions 230A1 and 230A2 of the winding portion 230A in length in the track width direction TW.

An example of the sizes of the winding portions 130A and 230A will now be described. In this example, the linear conductor portions 130A1 and 130A2 of the winding portion 130A have lengths in the track width direction TW of 6.0 μm and 2.0 μm, respectively, whereas the linear conductor portions 230A1 and 230A2 of the winding portion 230A have lengths in the track width direction TW of 12.6 μm and 8.6 μm, respectively. In this example, the length of the linear conductor portion 130A1 is reduced to approximately 48% of the length of the linear conductor portion 230A1, and the length of the linear conductor portion 130A2 is reduced to approximately 23% of the length of the linear conductor portion 230A2.

Further, in this example, the winding portion 130A has a dimension in the track width direction TW of 16.4 μm, whereas the winding portion 230A has a dimension in the track width direction TW of 20.4 μm. The winding portion 130A and the winding portion 230A are both 16.9 μm in dimension in the Y direction. Thus, the winding portion 130A is smaller in size than the winding portion 230A. The entire length of the winding portion 130A is therefore smaller than that of the winding portion 230A.

In the present embodiment, as described above, the linear conductor portions 130A1 and 130A2 of the winding portion 130A are reduced in length. This allows the first and second columnar portions 114 and 115, the coupling portion 125 and the plurality of magnetic path portions 128 to be brought closer to the medium facing surface 70 without an excessive increase in resistance of the winding portion 130A. Thus, according to the present embodiment, it is possible to bring the first and second columnar portions 114 and 115 closer to the medium facing surface 70 and reduce the entire length of the coil 130. Consequently, according to the present embodiment, it is possible to provide a magnetic head for thermally-assisted magnetic recording that exhibits excellent write characteristics in a high frequency band and has the coil 130 of a low resistance.

Further, in the present embodiment, the return path section R includes the plurality of magnetic path portions 128 (128A to 128D), and the coil 130 includes the winding portion 130A disposed around the assemblage of the plurality of magnetic path portions 128. According to the present embodiment, as with the first embodiment, this makes it possible to inhibit a decrease of magnetic flux caused by the skin effect of magnetic flux while preventing an increase in the length of the magnetic path formed by the main pole 124 and the return path section R and an increase in the resistance of the coil.

The remainder of configuration, function and effects of the present embodiment are similar to those of the first embodiment.

The present invention is not limited to the foregoing embodiments, and various modifications may be made thereto. For example, in the first embodiment, the magnetic layer 33 of the return path section R may be replaced with a plurality of magnetic path portions configured in the same manner as the plurality of magnetic path portions 42. Further, as far as the requirements of the appended claims are met, the number and the shapes of the plurality of magnetic path portions are not limited to the examples illustrated in the foregoing embodiments, and can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A magnetic head for perpendicular magnetic recording, comprising:
    a medium facing surface facing a recording medium;
    a coil producing a magnetic field corresponding to data to be written on the recording medium;
    a main pole having a first end face located in the medium facing surface, the main pole allowing a magnetic flux that corresponds to the magnetic field produced by the coil to pass, and producing a write magnetic field for writing the data on the recording medium by means of a perpendicular magnetic recording system; and
    a return path section made of a magnetic material and having a second end face located in the medium facing surface, the return path section being connected to the main pole so that a space through which part of the coil passes is defined by the main pole and the return path section,
    the return path section including a plurality of magnetic path portions that separate the magnetic flux into a plurality of fluxes and allow the fluxes to pass therethrough in parallel,
    the magnetic head further comprising a nonmagnetic layer separating the plurality of magnetic path portions from each other, wherein
    the coil includes a winding portion disposed around an assemblage of the plurality of magnetic path portions, and
    in any cross section that intersects all of the plurality of magnetic path portions, a distance between two adjacent magnetic path portions is smaller than a minimum width of each of the two adjacent magnetic path portions, and only the nonmagnetic layer is present between the two adjacent magnetic path portions.

2. The magnetic head for perpendicular magnetic recording according to claim 1, wherein the plurality of magnetic path portions intersect a cross section perpendicular to a direction of travel of the recording medium.

3. The magnetic head for perpendicular magnetic recording according to claim 1, wherein
    the second end face includes an end face portion located on a front side in a direction of travel of the recording medium relative to the first end face,
    the return path section further includes a write shield and a yoke layer, the write shield having the second end face, the yoke layer being magnetically connected to the write shield and located on the front side in the direction of travel of the recording medium relative to the main pole, and
    the plurality of magnetic path portions magnetically couple the yoke layer and the main pole to each other.

4. The magnetic head for perpendicular magnetic recording according to claim 1, further comprising a waveguide and a plasmon generator, wherein
    the waveguide includes a core through which light propagates, and a cladding provided around the core,
    the plasmon generator has a near-field light generating part located in the medium facing surface, and
    the plasmon generator is configured so that a surface plasmon is excited on the plasmon generator based on the light propagating through the core, and near-field light for applying heat to the recording medium is generated from the near-field light generating part based on the surface plasmon.

5. The magnetic head for perpendicular magnetic recording according to claim 4, wherein
    the first end face and the second end face are located at positions different from each other in a direction of travel of the recording medium,
    the near-field light generating part is located between the first end face and the second end face,
    the return path section further includes first and second columnar portions and a coupling portion, the first and second columnar portions being located on opposite sides of the core in a track width direction and spaced from the core, the coupling portion coupling the first and second columnar portions to each other, and
    the plurality of magnetic path portions are connected to the coupling portion, being disposed such that the coupling portion is interposed between the core and the plurality of magnetic path portions.

* * * * *